(12) United States Patent
Rappaport

(10) Patent No.: US 8,489,546 B2
(45) Date of Patent: *Jul. 16, 2013

(54) CLEARINGHOUSE SYSTEMS AND METHODS FOR COLLECTING OR PROVIDING QUALITY, SERVICE, OR ASSET INFORMATION PERTAINING TO WIRELESS COMMUNICATIONS

(76) Inventor: Theodore S. Rappaport, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,711

(22) Filed: Jun. 7, 2012

(65) Prior Publication Data

US 2012/0246142 A1 Sep. 27, 2012

Related U.S. Application Data

(63) Continuation of application No. 12/208,007, filed on Sep. 10, 2008, now Pat. No. 8,224,794.

(60) Provisional application No. 60/971,175, filed on Sep. 10, 2007, provisional application No. 60/977,582, filed on Oct. 4, 2007, provisional application No. 61/028,261, filed on Feb. 13, 2008.

(51) Int. Cl.
| G06F 17/00 | (2006.01) |
| G06F 17/30 | (2006.01) |
| H04W 4/24 | (2009.01) |
| H04W 24/00 | (2009.01) |
| H04W 64/00 | (2009.01) |
| H04B 3/54 | (2006.01) |
| G06Q 10/00 | (2012.01) |

(52) U.S. Cl.
USPC ........... 707/609; 707/688; 707/705; 707/748; 707/825; 707/827; 455/404.2; 455/405; 455/452.2; 455/456.1; 705/14.29; 705/14.52; 705/301; 705/348

(58) Field of Classification Search
CPC ............ G06F 17/00; G06F 17/30; H04W 4/24; H04W 24/00; H04W 64/00; H04B 3/54; G06Q 10/00; G06Q 30/00
USPC .................. 707/608–609, 688, 705, 748, 825, 707/827; 455/417, 445, 560, 404.2, 405–406, 455/408–409, 414.2, 422.1, 424–425, 452.2, 455/456.1; 379/1.01, 9.04, 32.01, 88.09, 379/114.08; 709/203, 206, 215–220; 705/33, 705/14.1, 14.11, 39, 348, 301, 341, 14.29, 705/14.4, 14.52
See application file for complete search history.

(56) References Cited

U.S. PATENT DOCUMENTS

| 5,561,704 A | 10/1996 | Salimando |
| 5,978,236 A | 11/1999 | Faberman et al. |

(Continued)

FOREIGN PATENT DOCUMENTS

| WO | WO 98/43197 | * 10/1998 |
| WO | WO 00/36815 | 6/2000 |

(Continued)

OTHER PUBLICATIONS

Tony H. Grubesic et al. "Geographies of imperfection in telecommunication analysis", Telecommunications Policy 29 (2005) 94 69-94.*

(Continued)

Primary Examiner — Srirama Channavajjala
(74) Attorney, Agent, or Firm — Whitham Curtis Christofferson & Cook, PC

(57) ABSTRACT

A computerized system, method and process allows telecommunications carriers to find, evaluate and select locations for equipment through direct access to end users, while providing citizens the opportunity to offer the use of their dwelling or other assets to carriers. The system and method further provides a computerized mechanism for (a) creating an inventory and marketplace for available properties for use in telecommunications networks, (b) providing quality and/or performance monitoring and control for wireless communication systems based on data in the clearinghouse, and (c) providing localized content over wireless networks using the clearinghouse.

44 Claims, 15 Drawing Sheets

U.S. PATENT DOCUMENTS

| | | | |
|---|---|---|---|
| 6,023,699 A * | 2/2000 | Knoblock et al. ............... 1/1 |
| 6,108,557 A | 8/2000 | Wax et al. |
| 6,169,791 B1 | 1/2001 | Pokress |
| 6,202,023 B1 * | 3/2001 | Hancock et al. ............ 701/516 |
| 6,381,465 B1 * | 4/2002 | Chern et al. ............... 455/466 |
| 6,766,322 B1 | 7/2004 | Bell |
| 6,996,610 B2 | 2/2006 | Bantz et al. |
| 7,782,848 B2 | 8/2010 | Kalavade et al. |
| 7,933,605 B2 | 4/2011 | Rappaport et al. |
| 8,095,437 B2 * | 1/2012 | Holmes et al. ............... 705/30 |
| 8,107,956 B2 | 1/2012 | Vakil et al. |
| 8,224,794 B2 * | 7/2012 | Rappaport ................. 707/694 |
| 8,254,939 B2 | 8/2012 | Xia et al. |
| 8,306,208 B2 * | 11/2012 | Montemer ............ 379/218.01 |
| 2001/0034204 A1 | 10/2001 | Pentikainen |
| 2002/0023010 A1 | 2/2002 | Rittmaster et al. |
| 2002/0136391 A1 | 9/2002 | Armstrong |
| 2002/0155843 A1 * | 10/2002 | Bahl et al. ................ 455/456 |
| 2003/0026231 A1 * | 2/2003 | Lazaridis et al. ........... 370/338 |
| 2003/0072425 A1 | 4/2003 | Hurst |
| 2003/0200296 A1 | 10/2003 | Lindsey |
| 2004/0076283 A1 * | 4/2004 | Egan ......................... 379/325 |
| 2004/0088333 A1 | 5/2004 | Sidman |
| 2004/0143529 A1 | 7/2004 | Frattalone |
| 2005/0130667 A1 | 6/2005 | Boiero et al. |
| 2005/0201525 A1 | 9/2005 | Hudson |
| 2006/0015375 A1 | 1/2006 | Lee et al. |
| 2006/0031082 A1 | 2/2006 | Amaitis et al. |
| 2006/0143111 A1 | 6/2006 | Mylet |
| 2006/0178918 A1 | 8/2006 | Mikurak |
| 2006/0203738 A1 | 9/2006 | Fok et al. |
| 2007/0155411 A1 | 7/2007 | Morrison |
| 2007/0165805 A1 | 7/2007 | Altberg et al. |
| 2007/0198339 A1 | 8/2007 | Shen et al. |
| 2008/0031211 A1 | 2/2008 | Kalavade et al. |
| 2009/0089399 A1 | 4/2009 | Beck et al. |
| 2010/0165862 A1 | 7/2010 | Nylander et al. |
| 2010/0167732 A1 | 7/2010 | Vakil et al. |
| 2010/0250268 A1 | 9/2010 | Rappaport |
| 2010/0250269 A1 | 9/2010 | Rappaport |
| 2010/0299274 A1 | 11/2010 | Rappaport |
| 2011/0002242 A9 | 1/2011 | Perlow et al. |
| 2011/0058657 A1 | 3/2011 | Alegret et al. |
| 2011/0257986 A1 | 10/2011 | Deanne et al. |
| 2012/0239498 A1 * | 9/2012 | Ramer et al. ............. 705/14.53 |
| 2012/0253997 A1 * | 10/2012 | Kovalev ...................... 705/30 |
| 2012/0275359 A1 * | 11/2012 | Knaggs et al. ............. 370/311 |
| 2012/0329455 A1 * | 12/2012 | Norp et al. ................. 455/433 |

FOREIGN PATENT DOCUMENTS

| | | | |
|---|---|---|---|
| WO | WO 2011/095618 | * | 8/2001 |
| WO | WO 02/31706 | * | 4/2002 |
| WO | WO 03/039119 | | 5/2003 |
| WO | 2005/101878 A1 | | 10/2005 |
| WO | WO 2005/101878 | * | 10/2005 |
| WO | WO2007144568 | | 12/2007 |
| WO | WO 2008/115992 | * | 9/2008 |

OTHER PUBLICATIONS

Juha, Kalliokulju, "Quality of service management functions in 3rd generation mobile telecommunication networks", IEEE 1999, pp. 1283-1287.

* cited by examiner

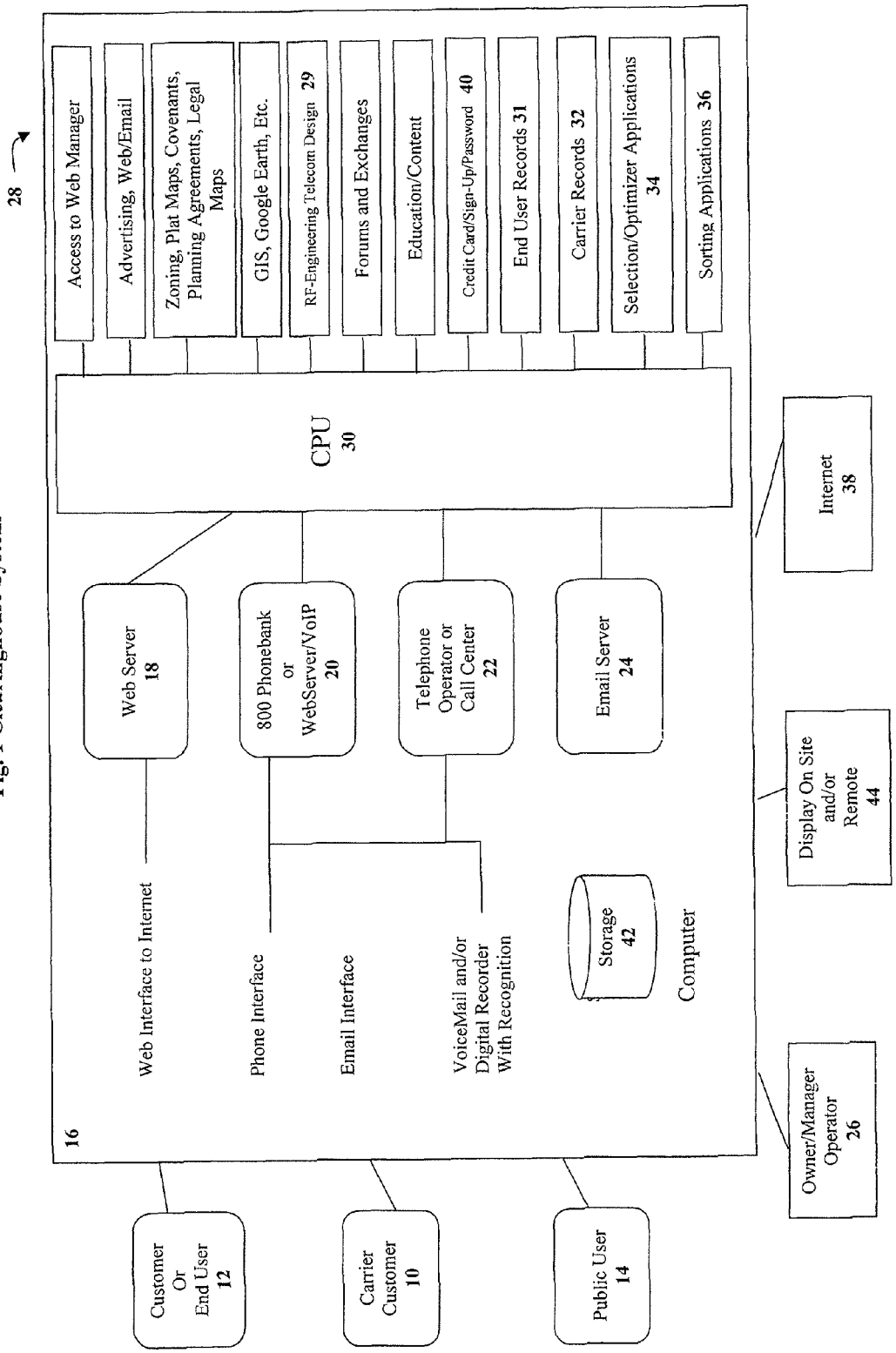

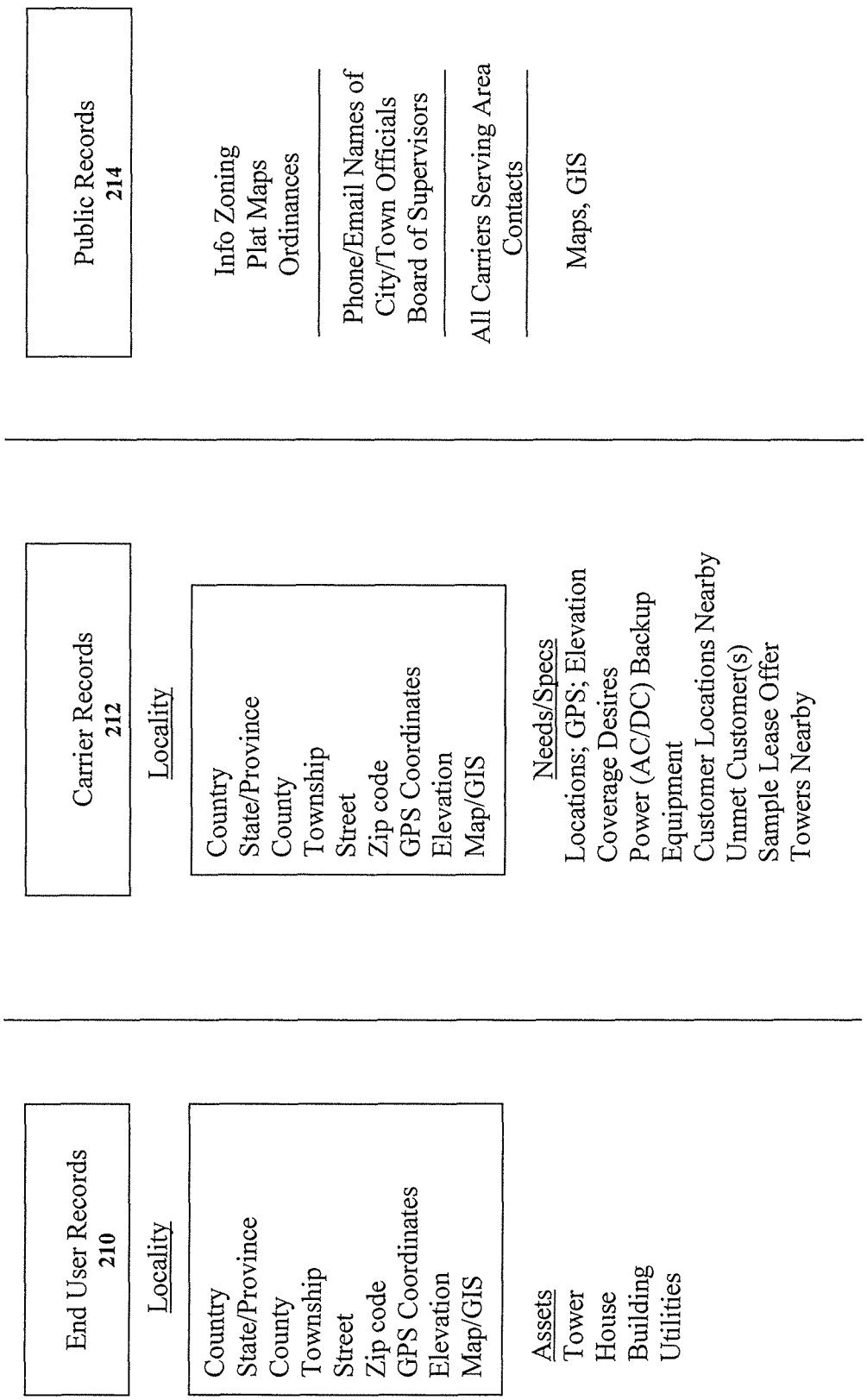
Fig. 2 All Records

Fig. 3

End User Form

Name
Address
Phone/Email
Own or Rent?
Property Size
Identify Plat Map or Similar
Locator_____
Call_____

Your Interests:

I have a:  Tower ☐
           Rooftop ☐
           Outbuilding ☐
           Church Steeple ☐
           AC Power ☐
           Backup or Generator ☐

I would like: Free Internet ☐
              Installed Tower ☐
              Installed Generator ☐
              Monthly credit on service ☐
              Nothing ☐

Carrier Form

Name
Address
Phone/Email
Market_____

Number of Customers Currently in
Market_____

Number of Desired Customers in
Market_____

Enter GPS Coordinates of Current Equipment

Number of Sites:

Site 1  Latitude____  Longitude____
Site 2  Latitude____  Longitude____
Site 3  Latitude____  Longitude____

Specific Needs:

Towers ☐
AC ☐
AC Backup ☐
Cable Right of Way ☐
Storage Barn ☐
Base Station ☐

Click On Map 310

Click On Map 311

Phone reports back its "observations" to Clearinghouse

Local Advertiser Flow Chart

CLEARINGHOUSE SYSTEMS AND METHODS FOR COLLECTING OR PROVIDING QUALITY, SERVICE, OR ASSET INFORMATION PERTAINING TO WIRELESS COMMUNICATIONS

CROSS-REFERENCE TO RELATED APPLICATIONS

This application is a continuation application of U.S. Ser. No. 12/208,007 filed Sep. 10, 2008, now U.S. Pat. No. 8,224, 794 which claims priority to U.S. Provisional Patent Application 60/971,175 filed on Sep. 10, 2007, U.S. Provisional Patent Application 60/977,582 filed on Oct. 4, 2007, and U.S. Provisional Patent Application 61/028,261 filed on Feb. 13, 2008, and the complete contents of each of these applications is herein incorporated by reference.

BACKGROUND

Many companies own or lease towers, and have expertise in the positioning (sighting), leasing, designing and/or building of towers and other equipment that are used in providing or installing telecommunications networks. American Tower, Crown Castle, InnerWireless and America Connect, are examples of companies that own, lease, use, or construct towers or distributed antenna systems in and around towers or buildings to enable wireless communications services to be distributed by various users, including without limitation either their own company or their customers, such as AT&T Wireless, Vodaphone, Sprint, or public or private radio system operators. These companies have proprietary techniques, and their own staff which is generally quite large and includes lawyers, engineers, sales people, and accountants, to conduct some or all of the following businesses: charge rent for towers and or antenna systems, charge for tower/antenna maintenance or tower location services, provide engineering or physical plant maintenance for towers, or antennas, and other associated equipment, install equipment, provide wireless service for telecom carriers, argue zoning ordinances and request variances for tower or equipment installations, negotiate leases of rooftops or tower sites, and other related products and services pertaining to towers, antennas, and wireless infrastructure in general, in order to maintain and grow a business.

The aforementioned companies often use maps and population projections, along with topographical or geographical features, and radio frequency (RF) software simulators, in order to determine where to place towers or antennas for effective coverage of a service region, how high the tower should be, where a distributed antenna system (DAS) should be placed, what types of antennas are best suited for a particular need, and other technical, esthetic, physical, legal, or economic details regarding how towers and/or antennas will effectively support radio communications through its coverage regions and through its building database and tower database. These firms also generally use lawyers to review and assess zoning ordinances involved with the erection of towers or equipment, and to negotiate site leases or purchases.

U.S. Pat. Nos. 6,317,599; 6,442,507; 6,493,679; 6,499, 006; 6,625,454; 6,721,769; 6,850,946; 6,876,951; 6,971,063; 6,973,622; 7,019,753; 7,035,642; 7,055,107; 7,085,697; 7,096,160; 7,096,173; 7,155,228; 7,164,883; 7,171,208; 7,243,054; and 7,246,045, as well as patents and publications of such organizations as American Tower, Spectrasite (which merged with American Tower, Crown Castle International, Galaxy Engineering, InCode (bought by Verasign), and InnerWireless deal with technical issues that must be engineered for specific applications in the telecommunications business. These solutions are not aimed at or directly useable by ordinary end-user customers or ordinary landowners, homeowners, farmers, church parishioners, public service organizations, local governments, or building tenants who are generally not at all familiar with the technical details of telecommunications engineering, radio frequency planning, zoning restrictions, lease negotiations for tower sites, neighborhood covenants, or network management and operations. Further, the prior art does not at all contemplate the future, open-spectrum world of wireless, where carriers will likely be required by law to share their end users (e.g. subscribers) with other carriers or services, in a way that is similar to the Carterphone ruling and MCI rulings in the US that required AT&T to provide open access of equipment to its telephone (landline) infrastructure, and which is now adopted globally in the landline world.

Other companies, such as power utility and television cable companies, also have a need for accessing, designing, acquiring, or leasing towers, and using towers, light poles, rooftops, and other structures such as parts cabinets, remote power supplies, storage facilities for vehicles, and the like, for supporting the provisioning of their services. These carriers also have a need of being able to access the location of towers and other equipment, such as utility boxes and cabling, for maintenance purposes, and need to be able to access the physical locations of their equipment and cabling runs, for the purpose of installing or modifying, or upgrading equipment associated with its distribution of services. These companies pay staff and consultants large amounts of money to acquire real estate or to determine possible solutions to these problems.

In the specific case of tower companies, they typically lease or sell access to their towers to carriers, often with complicated lease arrangements, and at times may also sell their towers in undesirable or less useful locations. Typically, these leases and sales require complicated contracts, deal terms, and protracted negotiations through brokers and technical consultancies. Sometimes carriers own their own tower business subsidiary, again requiring large staff and costly consultants. The public is generally not aware of these activities and has no way to participate in this business or activity, which is a disadvantage for both the carriers and the public at large.

It is well understood that Ebay has emerged as a leader for citizens to auction goods directly over the internet, and the Ebay website allows people to auction off items through the internet without having to deal with a large staff or complicated legal agreements. Meanwhile, many Web 2.0 companies, such as MySpace, Itaggit, eHarmony, and Facebook allow people with similar interests or specific needs to meet on line, and allow the exchange of information between people, often resulting in bartering or sharing of knowledge or information. Google has become one of the most trusted sources to find information on the web, because of its powerful searching capability to find postings on many topics. The public is able to access items quickly, efficiently, and at no cost to them. All of these previously mentioned websites allow people to easily and directly interact, without a lot of overhead or hassle.

Unfortunately, however, customers of internet or telephone service are generally viewed by the carrier as passive subscribers, paying a monthly bill to the telecom provider but not actively participating in the engineering or business improvement of the telecom provider's service. Today, telecommunication customers generally have no ability to readily participate in the improvement of services or the quality of their provider, or to actively play a useful role in the distribution of the telecom company's capabilities, except through the action of calling customer service to complain about their personal service experience. Today's telecom end-user customer is virtually powerless to readily participate in the improvement of delivery of service of a commercial telecommunication company's product, and is thus shut out from benefiting financially from any such improvement that that individual customer might otherwise be able to offer. While there may be special cases, where "someone knows someone at the telephone company who has a problem", by and large, telecom companies have no way to readily scale or access the interests of individual customers who have a willingness and interest to help improve their own telecom experience, while also helping the carrier.

In short, today, there does not exist a system or method or apparatus that allows for the general public to easily alert or notify their telecommunications carrier, or any carrier, that they are interested and willing to offer their premises to allow the carrier to improve service. Further, there does not presently exist a public clearinghouse where carriers can explore readily (and without public knowledge, if so desired) available tower sites or available real estate or land available to their business needs. Not only does the public lose the ability to help the carrier, but the carriers also lose out because they are not aware of those customers who would be willing to help them with infrastructure or over-the-air monitoring needs. Instead, carriers pay high priced consultants in a close marketplace for infrastructure acquisition, thereby missing out on a virtually unlimited untapped number of viable sites for use by their businesses.

Currently, companies such as Tropos Netwtorks, and the MotoMesh and Canopy products (by Motorola), and many other companies are offering wireless telecom gear that can offer communications network connectivity, where network traffic is sent wirelessly through one or several nodes of a network over a geographic area such as a city. An example of this was explained at the 2006 Texas Wireless Summit conference by a Tropos Networks executive, October 2006, in Austin Tex. Many cellular, WIMAX, and Wireless Internet Service Providers (WISPs) today are deploying cellular or hub and spoke networks using line of sight radios at 900 MHz, 2.4 GHz, and 5 GHz in various unlicensed (and sometimes licensed) bands for backhaul, and cable television over wireless and T1/T3 wireless replacements are sure to emerge as a vital marketplace. WiMax and $4^{th}$ Generation cellular, with increasing bandwidths, will require more tower/site locations per square km, in line with the Power vs. Bandwidth tradeoff, that requires that more towers per square kilometer be used when the operating bandwidth increases for a given transmit power. See Wireless Communications: Principles and Practice, c. 2002, Prentice Hall, written by the inventor. Many cellular carriers, public/private network carriers, municipalities, WISPs, etc. today struggle with finding suitable towers or rooftop locations, or struggle gaining access to water tower locations, and are often hindered by zoning ordinances, lack of public understanding, or knowledge of why and how they could easily place their equipment to serve customers. Even though many rural residents would love to have wireless service, it is difficult for many WISPs to deploy broadband networks with limited capital, and the difficulty with dealing with town ordinances, neighborhood covenants, and other restrictions, regulations, or bureaucracy involved for gaining permission to use or erect towers and other infrastructure deployments.

As an example, in today's implementation of Mesh or WiFi Networks, the deployments of such systems usually rely on a particular municipality (muni-wifi customer) to have its own tower infrastructure (for example, city lamp poles, or water towers or police towers near city hall, etc.) in order to build the system. Keeping track of this infrastructure currently is difficult, often requiring consultants or different software, operating in a stove-pipe fashion, across different municipalities, where there is little or no public way to view or add to the knowledge base of the infrastructure.

An important emerging trend is that as carrier frequencies go higher, and as digital signal processing and modulation techniques such as MIMO and OFDM improve, the physical size of antennas will decrease, or at least become distributed in space, meaning that the future tower structures and physical size of antennas needed for telecom's wireless communications links will shrink. Cooperative networking, mesh networking, and peer-to-peer communications will also likely evolve, making the base station infrastructure less different then the end user equipment, and less bulky than today's infrastructure. Thus, towers of the future will not need to be today's large, bulky and ugly cellular or line-of-sight microwave variety, but will be much more lightweight, less obtrusive (e.g. skinnier), and more convenient, less expensive, and readily available for use on rooftops, billboard, church towers, or home TV or ham towers, and requiring many more tower locations per square kilometer than today.

Wireless equipment is being installed throughout the world to bring telephone and internet services in locations where broadband previously did not exist. This is trend is certain to remain in other countries throughout the world, and most particularly in countries such as China, India, and other emerging nations that have a strong need to be connected on the world's telecom grid, e.g. the world wide web or telephone network. Because of the necessity of towers or antennas, and associated network equipment, to be situated at particularly good radio locations that are specific to each telecom company and their customer's specific locations, and given each carrier's need is specific to their own network's specific design criteria and history of evolution, and because of the radio propagation aspects and geographical impact associated with wireless transmissions, it has been heretofore impossible for telecom companies to engage in direct communication with a large customer base, in order to energize and engage its customer base to help its product and service delivery.

Today, the inventor envisions very early signs of what will eventually be the "democratization" of the telecommunications infrastructure industry, where all users may participate in helping carriers locate infrastructure, and where open-access spectrum will require that all subscribers of any particular carrier be allowed too use the spectrum and services of competing carriers. Today, end user customers are willing to subscribe to satellite TV services, such as Echostar or Direct TV, and as part of that service, home owners allow the satellite carrier to bolt antennas and cables onto their homes or on masts in their yards. These satellite services require that a technician come directly to the end user's home, and in a matter of just a few hours, the technician installs a satellite dish and receiver on the roof, yard, or telephone pole or tree of the end-user's property, often having to drill holes through the exterior of the home, or through a wiring cabinet to bring the cable into the end users home, all the while hammering/bolting hardware to the exterior or roof of the home. Customers are willing to allow equipment to be installed at their premises, as shown by the satellite TV industry, and its very rapid growth in just a few years. While satellite dish antennas serve the individual homeowner, the satellite system is a receive-only system and the equipment installed at the homeowner does not allow the satellite provider to improve the delivery of its content to neighboring houses or neighborhoods. Furthermore, there does not exist a public clearinghouse that lets others know which homes have satellite dish equipment in their yards, and which do not. But this example is an early indicator, illustrating how citizens are now willing to have alien telecom equipment installed on their own premises, and to allow a technician to climb around on the roof, yard, and drill holes in the house, if it provides some benefit to them (e.g. gives them the ability to watch satellite TV). Note that satellite antennas being installed today by Echostar and DirecTV are relatively small and unobtrusive, which is a harbinger of future wireless technologies.

Today, customers do not have a methodical, computerized way of receiving perks or bartered value in addition to improved service from carriers, in exchange for giving carriers the right to install and operate the carrier's special equipment on its own property. However, if the carrier was able to communicate and take inventory of each end user's capabilities, the carrier could derive great value in its business and technical operations beyond just servicing the end user, in exchange for the end user's willingness to allow the carrier access to its dwelling and property for the carrier's overall benefit. End users, if allowed to provide access to carriers, could enjoy the goodwill of the surrounding neighbors, as they would be acting as a provider and enabler of services that would benefit households around them.

Today, thousands of small, medium, and large telecom companies, such as wireless cable companies, wireless Internet service providers (WISPs), and mainstream wireless carriers throughout the world such as those companies mentioned above are deploying wireless broadband networks, using an inventory of towers and or building structures where they have access, to deliver last-mile services, but with no ability to enlist or solicit the interests of ordinary citizens or even hobbyists who, if they were aware of the opportunity, might be willing to offer assistance to carriers. Today, the telecommunications industry is unable to solicit the help directly from its customer base, or from the citizenry at large, because of the previously mentioned technical difficulties and trust issues involved with tower and equipment site selection, and the sheer lack of ability to communicate the needs and wants and capabilities of the service provider, and the needs and wants and capabilities of the end customer, in an easy, clear, and orderly manner. There has not been, to date, a trusted source that carriers can rely upon to broker communications directly between end users and the carrier, itself. That is, there has not been, to date, such a "convener" for the telecommunications industry that would allow carriers to tap the interest of its end user customers to aid it in the rapid expansion, or improvement of quality and capabilities of telecommunication services, particular broadband, multimedia, WiFi, WiMax, cellular, satellite, public/private network, RFID or sensor based mass-communication networks, and at lower design, operating, and ongoing cost levels. Furthermore, as shown herein, there are enormous benefits for the provisioning of network services and content, on a localized or specific end-user basis, through the establishment of a trusted clearinghouse.

SUMMARY OF INVENTION

An exemplary embodiment of this invention is to provide a system, method, process, and apparatus that will dramatically enhance the knowledge of available wireless network infrastructure locations, which will reduce the costs of antenna, equipment, or tower site acquisition, dramatically improve the ability for carriers to deploy wireless networks from a cost, efficiency, and quality standpoint, and provide previously unavailable, non-obvious, and unknown methods, systems, processes, and techniques for carrier networks to be augmented or built from scratch more efficiently through the aid and participation of end users. In addition to the assistance offered by citizens through this invention, the invention further contemplates the public at large being able to contribute to and expand the knowledge base that may be exploited by both carriers and end users, since the invention contemplates that ordinances, laws, zoning regulations, technical details, and graphical data such as plat maps, topographical contours of land, and radio coverage zones, as well as educational information and public data, be made available through the disclosed clearinghouse. From this expanded knowledge, the invention exploits the clearinghouse to provide the ability to monitor and control large numbers of wireless devices across different networks and frequency bands for enhanced operation, based on location specific information. The invention also allows for location-specific content, such as advertising, to be provided to particular groups of telecommunication users in specific areas where infrastructure exists.

The present invention allows the customers of a carrier to benefit from better service, lower price for service, as well as receive benefits from the carrier for being a "helping" or "value added" customer, etc. while the carrier is able to use the "helping" customer to improve its service or better utilize its resources, better locate its infrastructure, and improve its capital expenditures. In the specific case of a telecom carrier, more effective, reliable and cost effective provisioning and placement of network gear, antennas, bandwidth allocation over its geographic region, more effective equipment or tower locations, etc. results from awareness and access to end users who are in a position to help the carrier. Furthermore, with this clearinghouse and included database comes the ability to monitor, in real-time or in non-real time, through automatic or manual processes, the performance or quality experienced by various end users and to provide rank ordering of various carrier services for end users in various locations throughout the earth, so that either/both the clearinghouse or an end user of wireless telecommunications services (or even a third party) may enjoy and archive/remember/know the performance or quality of service, such as performance metrics of wireless service, availability of service, a ranked list of preferred carriers, etc., as a function of where the wireless end user wishes or plans to use wireless service. The clearinghouse and database further allows localized content to be delivered to particular end users, or users in particular local areas, in a way not contemplated before.

It is the complexity of tower height, tower engineering and installation, antenna design and radio propagation fundamentals, and town ordinances and restrictions in neighborhoods, combined with the often secretive nature of a network operator's approach to coverage and quality issues, that has led to the current state of affairs, where specific companies and high priced consultancies serve as tower owners or brokers, and where specific, specialized companies provide for the telecom carrier detailed technical or electrical services, such as antenna engineering or propagation design, or access to building structures or towers, at higher costs than what telecom companies would likely pay if they otherwise could deal directly with their end customers in a non-confusing and trusted way. Not only is wireless infrastructure a problem for carriers today, but there are instances where a carrier would like to install power conditioning, wired infrastructure, vehicles, parking places, or backup equipment or gear in a particular location, and if the carrier could locate such devices or infrastructure on a particular customer's premises, it would be of great value to the carrier, particularly if the end user was trustworthy, had expressed an interest and willingness to help the carrier, and gained some consideration (e.g. free internet or payments to help with her power bill). The invention solves the problem stated in this paragraph, by democratizing the site acquisition process, and furthermore builds on the inherent knowledge created through the clearinghouse to create powerful quality/performance monitoring as well as localized content provisioning.

Mobiledea and its extension, CellReception.com, were started by Allen Tasi. These are firms or websites that use the FCC database of tower locations, and plot the approximate coverage for customers to see using Google Maps. These websites also allow customers to share comments on cellphone reception. Consumer-based websites and companies such as Mobiledia.com and CellReception.com provide revenues for the website owner by allowing for advertising by companies such as Radio Shack and various cellphone vendors, and the sites provide for public comments regarding cell reception, individual cellphones, and other cellular and wireless issues, but they do not serve in a clearinghouse capacity as contemplated by this invention. Antennasearch.com is a website provided by General Data Resources that provides a search of various public domain databases regarding tower locations and tower filings, such as the database provided by the FCC website that lists all tower locations and pending tower applications. Antennasearch.com generates an on-line report that shows a map of tower locations for a specific street address or zipcode. The on-line report may be completed by someone browsing the worldwide web. Google has recently begun to show the location of WiFi hotspots (infrastructure locations) on its Google Maps or Google Earth applications, in order to provide a position location capability for end-users. However, Google, AntennaSearch, and everyone else for that matter, has not offered a clearinghouse that allows any citizen or any carrier to exploit a database of wants and needs in order to create a marketplace for determining available infrastructure sites, and furthermore has not exploited such a clearinghouse in order to provision, monitor, or control wireless networks for the benefit of end users or carriers, nor has anyone further exploited such a database to offer localized advertising or site-specific content.

Clearly the aforementioned companies, services, and websites do not allow customers or the public to offer their own assets for the deployment of telecom services, nor do they shed light on antenna regulations, zoning ordinances, RF planning (suitable for specifying new or inventoried tower sites), or neighborhood restrictions. These types of websites furthermore offer no forum to exchange or add public domain documents pertaining to town ordinances or covenants for neighborhoods in specific zip codes, which would be of great value to end users, the public, and carriers wishing to serve that particular area. Zip codes are a popular sorting technique for parcel delivery services that are scheduling using the world-wide web for companies such as FedEx, DHL, and UPS. These websites also do not allow a carrier to discretely determine which of its customers, or potential customers, might have some land, tower site, rooftop, or building that he would be willing to allow the carrier to use for buildout of its network. Thus, there is no attempt currently to create a clearinghouse of telecom infrastructure assets, which may further be exploited to offer the capabilities disclosed herein.

Use of mapping technologies and applications such as Google Maps or a GIS package, such as the USGS, or commercial programs such as those made by EDX Engineering, Wireless Valley Communications (now owned by Motorola), Comsearch, Celplan, etc., are well known in the art. In schools across the world, students are learning how to interact with Google Maps and other GIS applications, even when they have no or little regard for wireless theory, telecom regulations, the needs of the telecom industry, or RF propagation. For example, at the Massachusetts Institute of Technology (MIT) in Spring 2007, a computer science course on pervasive human-centric and mobile computing (MIT 6.883 taught by Larry Rudolph) had students using Google Maps to create circular contours of hypothetical tower locations, without regard for tower zoning ordinances or RF coverage or equipment installation guidelines, and with no contemplation of the invention disclosed herein. The user's manuals for these mapping technologies and applications, and the course notes and links to information which are posted on the world-wide web for the Spring 2007 Class of 6.883 at MIT are hereby incorporated by reference. It should be evident that none of these contemplate or make obvious the invention disclosed herein.

See:
http://people.csail.mit.edu/rudolph/Teaching/home883.html, and
http://people.csail.mit.edu/rudolph/Teachings/ps1.pdf This patent describes a computerized "convener" apparatus, system, and method where individual citizens or businesses of a community may offer the use of their homes, land, building structures, outbuildings, apartments, billboards, churches, water towers, towers, trees, light poles, barns, and any other possible location on or about their premises to eager telecom service providers. Up until now, telecommunications companies were not able to alert a wide customer base that it needs a specific tower located at a particular latitude and longitude or street address, for example, that it needs a tower that complies with neighborhood covenants, town ordinances, and yet requires a tower that permits RF propagation with a signal strength (say of −70 dBm), and a particular front to back ratio (say of 20 dB) at a particular address or geographic region in order to cover a particular neighborhood that is just out of reach of its existing towers. Until this invention, a telecommunications company could not acquire the information from its large customer base as to who would be interested in helping them with a specific tower location. It simply has not been done in the history of the telecommunications industry, and this invention solves this unmet need to allow both customers and telecom providers to benefit. Furthermore, this invention provides the key to offering services to end users and to carriers, as well as third party intermediaries as the telecommunications world evolves to an open-standard, where end users may share the networks of many competing providers.

Today, carriers are often secretive about where they have service problems because it may alienate customers in that area, and could allow competitors to seize opportunities where the carrier is known to be having poor quality or coverage problems. This invention solves this problem, among others.

Furthermore, this patent describes a new kind of apparatus, system, and method that can exploit the inventorying and clearinghouse information provided by end users, carriers, and the public, in a farm such that it may be franchised or distributed in a private label or Original Equipment Manufacturing (OEM) manner, and where the systems and methods described herein may be offered as a trusted service by carriers, non-profits, for-profit companies, governments, inteuiiediaries and the like, either across specific customer types, or within specific geographic localities.

This invention applies to any carrier-based system, but is preferably used for a telecommunication network, no matter what the distance is between users of the network, whether it is wired or wireless, or what the transmitter-receiver separation distance is of wireless components, or what the technology, modulation, access method, etc. may be. That is, this patent is not limited to wireless, optical, cellular, WiMax, Mesh, WiFi, RFID, LMDS, cable, or satellite, and not limited to fixed, mobile, or portable operation by users, as it is intended to be used in its broadest form, as would be understood by one skilled in the art in deploying, designing, operating, or using such a network that has end users, and where infrastructure is needed and must be located, at physical locations, for carrying out communications, either wired or wireless communications, and also as well anticipating the provisioning of an open access environment where federal or local regulations require end users to have access or the ability to specify or select (either manually, pre-selected, or automatically on-the-fly as the wireless device is used by the end-user) more than one single carrier for broadband access with a particular end user and/or her device. Thus, this invention serves the needs of indoor/enterprise networks or femtocells within public or private buildings, as well as microcell or macrocell cellular network usage and coverage ranges, emerging WiMax systems, satellite systems, future cable TV/wireless networks, and city/county, country, or worldwide networks, and public safety networks, whether public or private.

Furthermore, this invention may be extended beyond telecommunications, and may be applied to any carrier-based service, where subscribers pay for an on-going service over a period of several days, months, or years, and where participation of the end users, and direct interaction between the carrier and the users could improve the efficiency, quality, business operations, or technical operations of the carrier over its serving areas.

The invention allows a $3^{rd}$ party entity (A person, or a corporation, say a website company, or tower holding company, or an intermediary, for example) to offer inventory and polling services to carriers and the carrier's customers (end users), as well as to the public, through the use of the knowledge-base that is created from the clearinghouse of interested citizens willing to assist telecom companies.

The invention further allows a person or a carrier or an intermediary to inform, educate, and solicit inputs from its customers regarding its customer's interest or ability to help the carrier with expansion, alteration, or improvement of the carrier's network, or on multi-carrier networks, through the use of the knowledge-base that is created from the clearinghouse of interested citizens willing to assist telecom companies.

The invention provides a system and method and process that allows a person or a company, such as a publisher, a Web 2.0 company, a carrier, or a trusted web portal, to offer an e-magazine, a printed magazine, a newsletter, a website, and/or an internet blog, where each may include an inventorying service between one or more carriers and its customer base of end users, such that end users are able to provide the carrier an inventory of their assets that may be used to help the carrier(s).

The invention provides a system and method and process that allows a person or company, such as a publisher, a Web 2.0 company, a carrier, a tower holding company, or a trusted web portal, to offer an e-magazine, a printed magazine, a newsletter, a website, or an internet blog, where each may include a bartering system and method between one or more carriers and its customer base, for the bartering of installation or redeployment of equipment at the end user's dwelling in exchange for compensation of some type from the carrier(s) or an intermediary.

The invention provides a system and method and process that allows a person or a company, such as a publisher, a Web 2.0 company, a carrier, or a trusted web portal, to offer an e-magazine, a printed magazine, a newsletter, a website or an internet blog, where each may include a registration system and method between a carrier and its customer base, whereby end user customers may register to express interest and ability to support equipment at their dwelling with one or more carriers, and where each may include a system and method that allows a carrier to execute an agreement regarding the installation or modification of telecommunications equipment at the dwelling owned or or used or controlled by end users in its customer base, with pre-negotiated or selectable terms for remuneration, or with terms handled over the internet or through computer access, thereby eliminating the need of costly lawyers and protracted, cumbersome negotiations for site acquisition which is the state of affairs today.

The invention provides a system and method and process that permits carriers or an independent clearinghouse, or a third party intermediary, to communicate with end user customers, or the wireless devices of end-user customers, in order to aid the end-user in determining how and where new or existing telecommunications assets may be deployed or where service and which service is best or more preferred to the end user, while allowing performance or quality of service knowledge or rank ordering of available telecommunication services to be provided to a wireless end-user. The invention furthermore allows for the control of the operation of a wireless device for enhanced operation, in a particular location based on a ranking of performance or specific requests (made either automatically or as preset) by an end-user, or carrier, or a clearinghouse that provides knowledge on multiple carriers.

The invention provides a system and method and process that permits a clearinghouse to communicate with end user customers, or the wireless devices of end-user customers, in order to allow the clearinghouse to monitor the radio operating conditions and location of end user devices, whereby the monitored radio operating conditions and locations may be stored, processed and used to update the clearinghouse for monitoring wireless network performance and quality.

The invention provides a system and method that permits a carrier, technician or the end-user to determine how and where new or existing telecommunications assets may be deployed or are available. The system and method is available to the end user, and allows one or more carriers, or a clearinghouse with knowledge of multiple carriers, to provide measures of wireless quality and rank ordering of available telecommunication services to a wireless end-user, for the benefit of the end user, or to control the operation of a wireless device for enhanced operation, in a particular location based on a ranking of performance or specific requests by an end-user or carrier. Furthermore, the invention provides a system and method that permits one or more end users to report their observations of wireless performance and quality, or rank orderings thereof, as a function of location, to the clearinghouse so that the clearinghouse may maintain archived or updated knowledge of wireless quality as a function of location throughout earth.

The invention provides a system and method and process that allows a person or company, such as a publisher, a Web 2.0 company, a carrier, or a trusted web portal, to offer one or more of an inventorying, registration, lease agreement execution, and bartering service, system, or method to specific types of real estate owners in order to aggregate the assets available to form a database for the clearinghouse.

The computerized system according to this invention serves at least two types of customers: end users or carriers, with password protection and opt-in capabilities where the end users may chose to have their availability/interest in supporting carrier needs shared among more than one carrier.

The computerized system according to this invention provides the entry of customer interests/desires, customer data, and provides access to documents such as town ordinances, town zoning rules, neighborhood covenants, and contracts or sample contracts or agreements between telecom carriers and end users for allowing end users to aid the carriers under mutually agreeable terms.

A computerized system according to the invention allows end users or carriers or a third party to add documents such as town ordinances, town zoning rules, neighborhood covenants, state or local laws, and contracts or sample contracts or agreements between telecom carriers and end users.

A computerized system and method where a graphical information system (GIS), such as (but not limited to) Google Earth, MapInfo, USGS, is used with a database of infrastructure locations provided by end-users through the clearinghouse in order to aid carriers or end users for determining radio coverage footprints or possibly useful/valuable infrastructure locations.

A computerized system according to the invention allows radio propagation prediction algorithms to be run using the GIS and equipment models in order to determine coverage regions, obstacles due to terrain or buildings, and viable locations for towers, antennas, repeaters, nodes, and end user premise equipment.

A computer system according to the invention can be built upon a database of customer needs, and may also include carrier needs, that allows the rapid sorting and pinpointing of available locations for a carrier or other party to build, lease, or use a Dwelling or existing location for improvement of services.

A computer system according to the invention allows end users to learn about telecom laws, ordinances, opportunities, and technical details so that they are more knowledgeable and interested in assisting telecom carriers in the provisioning of telecom networks.

A computerized system according to the invention allows end users to rank their happiness or satisfaction with their carrier, or with information providers to the clearinghouse, after entering into a relationship through the "convener" clearinghouse, and where carriers or other parties may also rank their happiness with end users, as well.

A computer system according to the invention includes a database of locations of end users who are willing to assist with the provisioning of telecom services at their premises, combined with RF coverage details that enable the determination of promising locations of towers or structures (either existing or to be built), combined with legal records such as covenants, town ordinances, combined with plat maps or zoning boundaries, so that a telecom carrier or end user can quickly and easily see what is viable for provisioning of telecom services. One embodiment of the invention allows for the computerized system and method to automatically determine the best locations from a wish-list provided by one or more carriers or third parties, based on the available public records and end user inventory of locations available.

A computer system according to the invention allows for an educational or newsworthy web publication or paper publication to be created rapidly from content stored on a computer, where such web publication or paper publication may be private labeled or customized specifically for a particular carrier, neighborhood, locality, or group of people or specific entities/customers.

DESCRIPTION OF FIGURES

This invention will be further understood through illustrations provided in the accompanying figures, which are now described.

FIG. 1 is a block diagram of the clearinghouse computer system, including applications that run on the computer system, the types of interfaces provided to end-users, and the types of users of the clearinghouse.

FIG. 2 illustrates an embodiment of how the database of the clearinghouse system is organized, and the types of information and records maintained for each of the types of users.

FIG. 3 illustrates an example form that is completed by an end user or carrier for input to the clearinghouse system, using the various types of available interfaces.

DETAILED DESCRIPTION

Figure 4:
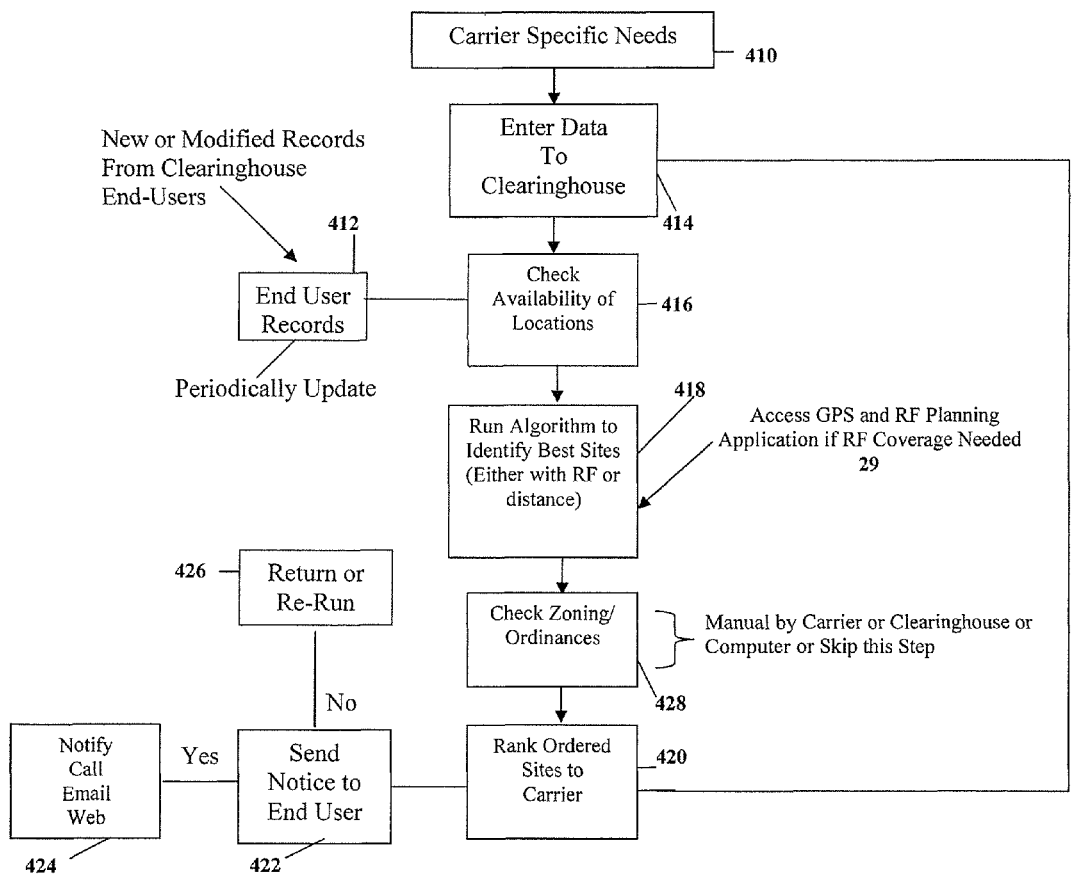
FIG. 4 illustrates a flow diagram of how the clearinghouse determines matches between the end user interests, the carrier's infrastructure requirements, and local ordinances that apply, and how the clearinghouse notifies the carrier. This also can assume an automated process that may have carrier involvement/intercession if required by the carrier to notify end users that they may be of assistance to the carrier's needs, and the terms and conditions available to the end user. Not shown, but implied, is the ability to generate lease forms or business forms needed to codify a legal and business agreement between end-user and carrier.

This invention uses a computer, also known as a central processing unit, or CPU, which may be a single computer, a web server, a cluster of web servers, or some other configuration of computing equipment, whether in series or in parallel or distributed that is able to obtain information through telephonic, text, voice/telephone, internet communication, or other methods known now or in the future. The computer runs programs and algorithms in order to prompt and to determine an end-user's interest in adding his or her property and locations, and facts about the available real estate that the end-user wishes to make available. The computer provides for the storage of provided information in memory of the computer, for use in the clearinghouse repository. The CPU is also understood to use memory for storage and retrieval of operating instructions which dictate the proper operation of the website, the response to various inputs from users via the worldwide web, telephone, or other various interfaces, and the programs needed to interpret inputs, store and process the received information, and to properly format and display the information, and also uses memory to retain information stored in databases, where such databases represent the details provided by end-users, or carriers, or which represent data that has been obtained through the use of web-crawlers from public websites, as further described in the accompanying figures.

The computer interacts with employees from carriers, or from the computers of other companies, such as carriers or tower companies, or from public websites, as well as from intermediaries that may help to store, cache, process, or post data to memory (where such memory is coupled to the clearinghouse computer, or elsewhere) in order to determine the specific needs and interests of the carrier or tower company. The computer is able to provide or process one or more of: automated voice prompts, speech recognition, touchtone recognition, web-based communication, handwritten, or human to human interaction, and so on. Through the computer interface, and the associated systems and methods described subsequently, end user customers of telecommunications services are able to make its telecom carrier, or, optionally, even potential competitors to their current telecom carrier, aware of his or her ability and/or interest to help carriers with their distribution of telecommunications services through the use of their own premises. Similarly, the computer interface and associated systems and methods described subsequently allow a carrier, a public organization, or optionally the general public to be aware of the locations at which citizens are willing or interested in allowing their locations to be used to house telecommunications infrastructure. Below are some useful definitions of terms used throughout this patent.

Dwelling or Premises: any property, building, outbuilding, structure, tower, vegetation, or land, or any thing on or in or over or under a property occupied or used or controlled by an end user for which the end user may wish to make available for use by others. The definition of "dwelling" may also include one or more rooftops, silos, billboards, trees, church steeples, poles, towers, ledges, parts of a building, outbuildings, lookouts, extensions to buildings, or signs, and/or any improvements.

Carrier: Any company or entity that offers services to an end user on a regular basis over time. The term "carrier" is intended to be given its broadest possible meaning, as it is meant to describe companies that offer to end users services such as telecommunications, connectivity, entertainment (such as movies, cable, multimedia, music, on all possible media and all possible delivery mechanisms), AC power for the home, mail delivery/retrieval, archiving or storage, inventorying, cleaning, yard maintenance, water delivery, laundry service, and the like.

End user: Any person or entity that participates in an ongoing service from a provider. An end user may be someone who simply stumbles across the clearinghouse disclosed herein, who browses or interacts with the clearinghouse only one time, or someone who interacts with the clearinghouse many times, and who may even list their infrastructure location with the clearinghouse disclosed herein. Alternatively, an end user may be a telecommunications subscriber or a clearinghouse participant who obtains cellphone or internet service from a telecom carrier or quality/ranking/performance information or local content from the clearinghouse. End-users may also include those people or entities which are not yet subscribing to the service offered by a carrier or the clearinghouse, but who have interest in participating and inquiring about the content of the clearinghouse and possibly contributing assets or capabilities to the clearinghouse or to a carrier, either from their own personal interest or edification, or because they hope to gain some benefit or remuneration of some kind at some point. An end user may be a person, but also may be an entity or an enterprise, such as a church, and apartment building complex, a co-op of people, a shopping mall, a car dealership or chain of car dealerships, or a business, either stand-alone or spread out on a campus or throughout the world, for example. End-users may be people from the general public, or may be a typical user from a specific type of user population (for example, employees within a large corporation may be end-users of the invention, if the invention were implemented in an enterprise fashion for a particular corporation. As another example, not meant to be limiting, an end user could be a ham radio operator who is a member of the American Radio Relay League, ARRL, if the invention were made available to all ARRL members). Other examples are readily understood.

Computer: May be a single computer or a group of computers, or CPUs, which may include associated circuitry and components, such as banks of memory (storage), back up gear, displays, human and machine interfaces of various kinds, parallel computer processors, distributed computer processors, distributed or single connections to the internet, distributed or single displays or editing/viewing capabilities, one or more web servers, mail servers, and multipurpose servers and routers, or any coupling of computerized components that allow for one or more of: telephonic answering, touch tone interpretation, voice recognition, handwriting recognition, facial or fingerprint recognition, stylus recognition or typed data entry (either directly from a keyboard, via telephone or internet connection, from a phone, over wired or wireless or optical connection), text recognition, file transfers, data transfers, file caching, file storage or entry or manipulation, running of software, hosting of applications, running of applications made up of computer programs from one or many sources, where components and software are coupled or combined as known to one skilled in the art. The term "Computer" is to be construed in its broadest interpretation, as the invention may clearly be practiced at a single location, distributed across a country, a city, or used worldwide with a network of computers and backup storage located throughout different continents, as it is contemplated to host at least one website, and to enable connections of the website with and between end users and carriers. This specification describes the operations implemented on a computer, but it must be understood that a computer with memory may be implemented in many ways, and that the computer of the clearinghouse may need to directly or indirectly interact with other computers and databases as provided by web intermediaries, such as Akamai that can cache/store/stream content, Rackspace or INetU, that can provide web hosting, and so on. The disclosed invention, including the computer (CPU) described herein, is understood to include the ability to interface using some or all of these known techniques for hosting a web-based clearinghouse for end users as described herein through the use of sub-contractors and external vendors and service providers for internet access and commerce.

Many techniques are known in the art for computers to be able to interact with and assimilate data from people. Consider some examples of telephonic and touch tone phone inputs that are provided by humans and are processed by a computer. Furthermore, voice recognition systems, and voice over IP (VoIP) calls to a computer are well understood today, and it is further recognized that end uses of telecom services, and people throughout the world in general, may access a computer in many different ways using the worldwide web. For example, web interfaces are used in programs for personal computers, and personal computers may be connected via any form of internet connection to a computer that hosts a website. Websites may also be accessed by cellphones, PDAs, tablet computers, such as those made by Motion Computing with handwriting and fingerprint recognition, and many other devices.

Websites which allow for posted materials, updated materials, and graphical and text interactions, even podcasts or videos, are well known in the art, as demonstrated by Google, Inc.'s wide range of web portals, as well as those by eBay, YouTube, Yahoo, and the like. All of these websites and product companies described above use a "computer" as contemplated here. Furthermore, automatic document generators are also well known and are in regular use today, where content can be bundled and packaged into web form, electronic media form, or print form, to have a homogenous look and feel, based on content that is stored in file formats such as files in .XML, .HTML, .BMP, .TIG, .GIF, .PDF and other formats known now or in the future, and through use of JavaScript programming language, and cross-platform techniques such as AJAX (Asynchronous Java Script and XML), which allows web applications to seem much more responsive by not interfering with normal web page loading.

To launch a commercial website, many companies provide tools and capabilities that make it viable. For example, InetU or Rackspace provide Managed Web Hosting, where they provide a computerized system that a customer (the website company) can use and access through a log in to edit, remove, add, or reorganize content in the form of webpages, downloads, documents, and a wide range of other viewable or useable multimedia forms that may be accessed by the public, or by password protected classes of users who may or may not pay a subscription for access to the website. Also, the website company may choose to simply do hosted services. In order to generate revenue, PayPal offers software and servicers that enables a hosted site to exploit the PayPal developer network to create webpage(s) that allows a website company to securely collect monies from the browsing public, accepting all major credit cards and PayPal currency through web transactions. To maintain databases that contain important information, a website company will use MySQL (open source) or SQLServer, or Postgress as a backend database system to store myriads of data records, for rapid access by the applications running on the computer, and other known document management techniques are used for archiving and retrieving documents, and for accessing applications over the web such as Google Earth, USGS, or county or local city/county plat maps, ordinances, or board meeting notes that are often available on line.

With reference to the drawings, FIG. 1 shows an exemplary embodiment of the Clearinghouse system. On the left portion of FIG. 1, various types of users of the system are shown. Note that Carriers 10, End user customers 12, and public users 14 each may have access to the clearinghouse 16 via a wide range of interfaces, including web 18, phone 20 or 22 (using cellphone or wired phone or VoIP phone), email 24, or through automated voice recognition or digital recorders (that may recognize speech, handwriting, fingerprinting, etc). The owner or operator or proprietor 26 (and any employees or subcontractors) of the clearinghouse 16 may also access the clearinghouse 16 by these interfaces, as well, and may have one or more additional proprietary interfaces to the system (not shown). On the right side of FIG. 1, a number of applications 28, capable of running on the Clearinghouse computer 30, or being controlled by the computer on distributed processors (not shown), and some applications which may be made available to only certain classes of users (e.g. end users, carriers, third parties, the public, owners/operators of the clearinghouse itself, and so on), are shown and are further described subsequently. FIG. 1 also shows that carrier records 32 and end user records 31 are also available to the computer 30, and that a sorting and parsing application 36 is available to process these records. Note that the Clearinghouse computer 30 is preferably coupled to the Internet 38, as shown in FIG. 1, so that the various users and user classes may access the Clearinghouse (FIGS. 1 and 6) and its database (FIG. 5) through the Internet (e.g. worldwide web), as well as the other interfaces shown in FIG. 1. Note that the Internet access shown in FIG. 1 may be a public web connection, or provided on a private network.

The carriers 10 and end user customers 12 may or may not be regular subscribers or participants of the clearinghouse 16. A preferred embodiment is for the clearinghouse 16 to have revenue-generating subscribers, where the carriers 10 and end user customers 12 sign up for access, preferably using credit card (although written check or wire transfer or debit card or purchase orders may also be accepted by the clearinghouse) for monthly or annual billing. The sign up and password management and credit card billing is preferably handled by the credit card sign up and password management application 40 (shown on right portion of FIG. 1). This application 40 is preferably run under computer control and provides various prompts through the interfaces for users to enter credit card data, password and user identification information, so that the Clearinghouse 16 may uniquely identify individual users, store their log in and password information, and store credit card information for billing purposes. These data may be stored in a single memory location 42 or in a distributed memory bank or in any other suitable storage medium or database, and would preferably be encrypted for privacy.

Figure 5:
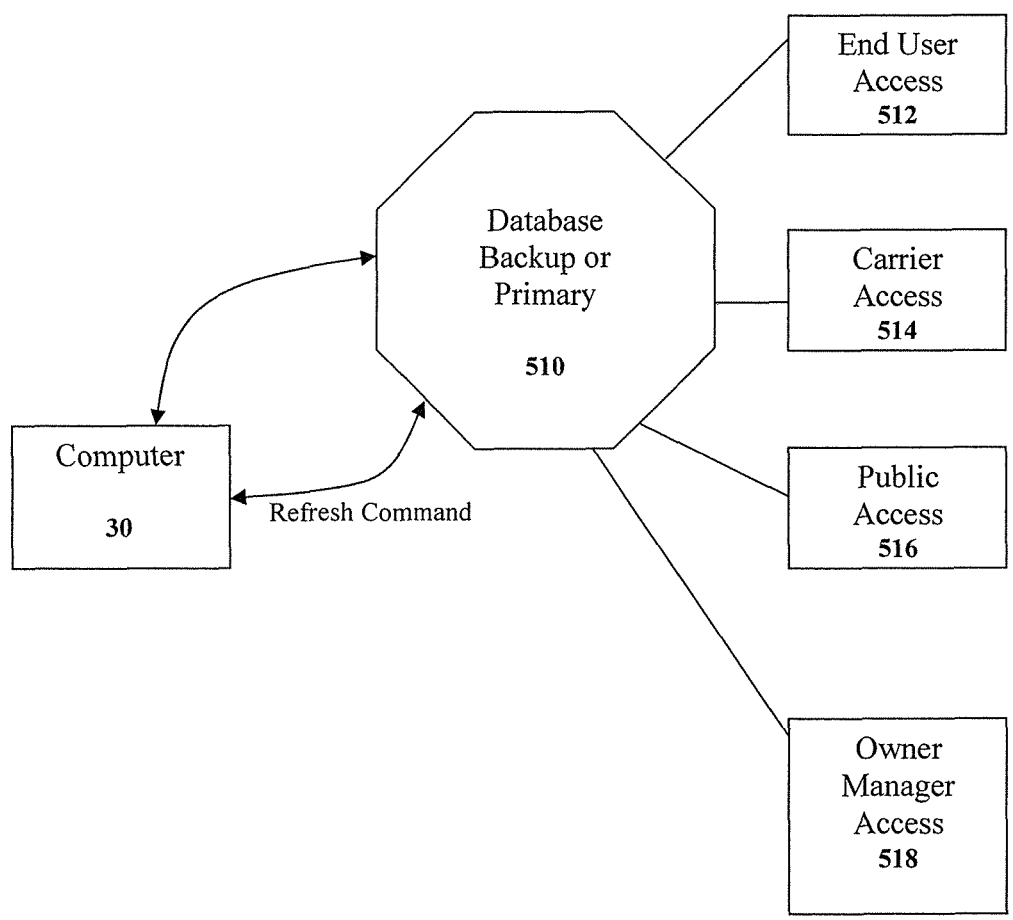
FIG. 5 illustrates a database, which may be a primary database or back-up database, which is accessible by various users of the clearinghouse, and which may be refreshed or updated upon computer command.
Figure 6:
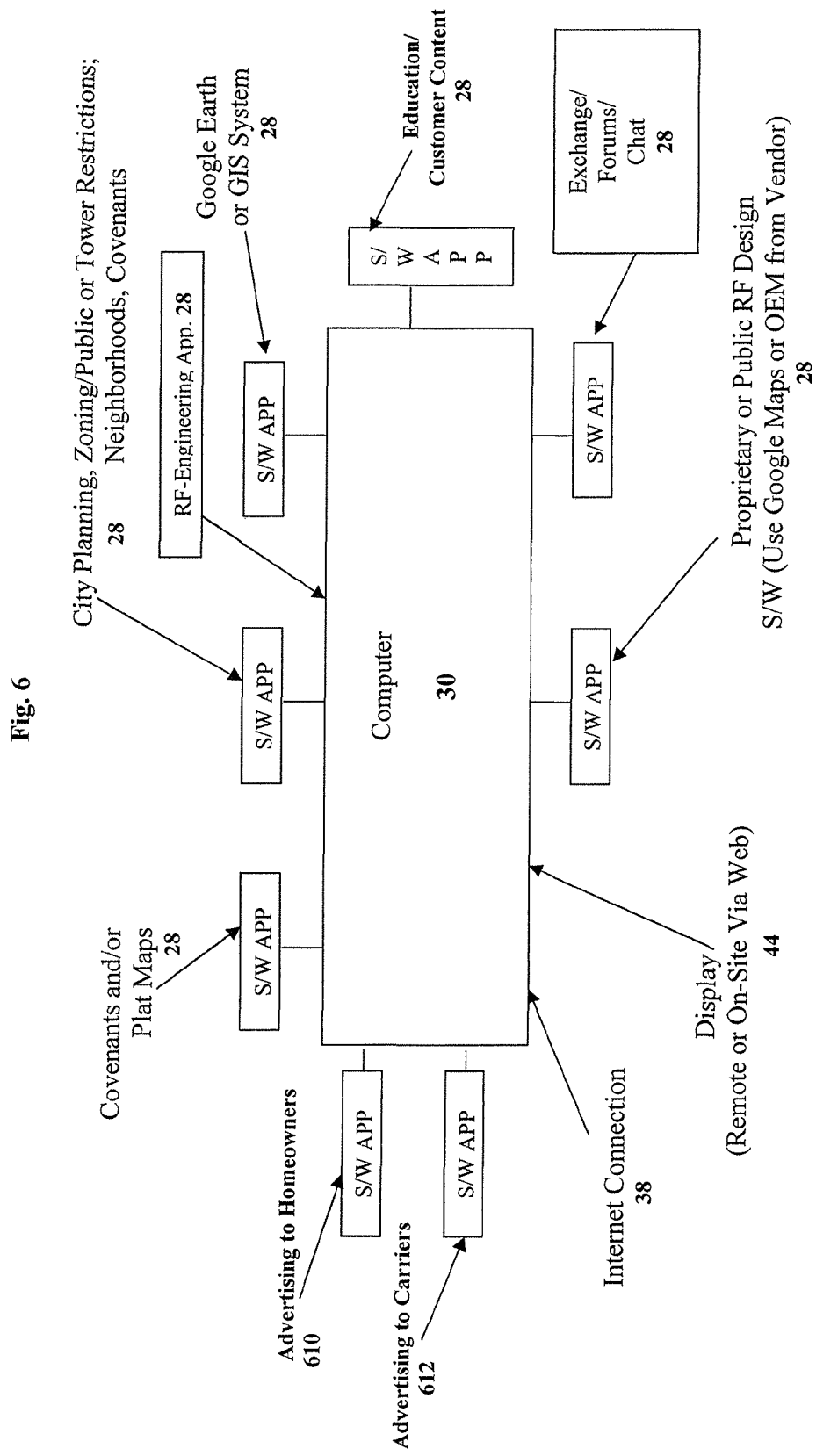
FIG. 6 illustrates the various applications that may be actuated by the invention, and which are available to users.

By signing up as a subscriber, for example over a year period, carriers have continual access to the clearinghouse and end user database (see FIG. 5) during that time, and some of the features that they would enjoy are exemplified by the various applications shown in FIG. 1 and FIG. 6. For example, a carrier 10 that is a user of the Clearinghouse 16 could provide its current locations of all its infrastructure assets and could also include desired "wish list" locations for infrastructure access through the carrier records application which is described in more detail subsequently (also see FIGS. 2 and 3). Based on the inputs, the computer 30 implements the sorting and parsing application 36 to periodically search the end user records 31 provided by end user 12. Note that in a preferred embodiment, the carrier 10 or the end user 12 may specify locations by simply clicking on a web page for "click on map" (not shown in FIG. 2, shown on FIG. 3 as 310), and then using a mouse or other computer indicating device, may simply click on a map displayed on a webpage in order to express or denote a particular location that is entered as a record 210. This capability is also available to general public users 14, and other users of the Clearinghouse 16 in order to rapidly denote locations of interest.

FIG. 3 shows, as an example, both an end user form and a carrier form, that exemplifies what may be used by users and presented by the Clearinghouse for data entry to create information used in the end user records and carrier records. Of course, other data as contemplated within this patent may be included, and is not shown in FIG. 3. Also, other approaches may be used to input data to the clearinghouse, including file transfers, catalog entries from third parties that aggregate user information, and other input techniques known to provide inputs of large numbers of customers into clearinghouses and their databases. For the case of a carrier 10 specifying its particular infrastructure needs, the user 10 (the employee, consultant, or agent of the carrier) could simply press "click on map" 311 shown in FIG. 3 in the carrier record form, and could identify portions of a map where needs exist as indicated above. Alternatively, carriers 10 could indicate their "wish list" for infrastructure by entering streets, counties, zip codes, Lat./Long. Coordinates, or even text descriptions of where they need coverage, or uploadable files that contain many listings of locations, in GPS or Lat./Long format, address, or zipcode format, etc. such that the computer could interpret the entry to determine the geographic locations of needed infrastructure (not shown on FIG. 3, but should be understood from this description). It is clear that carriers 10 could alternatively enter their current infrastructure locations using the carrier records (e.g., entering data on the form in FIG. 3—the form in FIG. 3 is preferably a computer-fillable form; however, paper based forms and electronic files can be used in some applications. In addition, the information in the thinu can include or more less information than that shown on FIG. 3). By having some or all of a carrier's infrastructure cataloged in the carrier records database (FIG. 5), the Clearinghouse 16 can then better manage the carrier's assets and better display and process the end user databases to meet the carriers current and future needs. For example, the Clearinghouse 16, given knowledge of the carrier's 10 complete inventory of existing infrastructure, could implement the RF engineering/planning application to take into account RF propagation, interference, spectrum use, and antenna patterns to better determine site needs and to provide management of RF planning for the carrier 10. Information generated by the Clearinghouse 16 may be displayed 44 on site or remotely, and different displayed information can be provided to different users 10, 12, 14, and 26.

The Clearinghouse database 510, shown in FIG. 5, is accessible by many different classes of users 512, 514, 516 or 518, and is made up of records provided and modified by end users and carriers, as shown in FIG. 1 and described above. The Clearinghouse database 510 also includes data that is submitted or provided by the public (e.g. through public websites, through links to external databases, or which is provided as inputs from general public users). Also, the employees/owners/managers/suppliers of the Clearinghouse itself must be able to access and at times manipulate the database. The Clearinghouse computer 30 or a computing system under its control determines the refresh update rate of the database 510, and governs how often the databases are backed up, refreshed, and modified for presentation to the outside world through the interfaces shown in FIG. 1. Thus, preferably the various classes of users, when accessing the Clearinghouse 16, are not necessarily obtaining the most recent information provided by all classes of users, but are obtaining information that is updated at a rate specified by or at least acceptable to the Clearinghouse computer 30, which would typically be once a day, but could be more often or less often. Data inputs might be made instantly at the discretion of the computer 30 or outside vendors or other computers which interface with computer 30. The term "database" means all of the data available to the Clearinghouse, but it should be clear when a subset of data is being discussed, the twit "database" may only refer to that subset of information. The term database should not be viewed as limiting, as the database for the clearinghouse may be implemented in parallel, distributed, real time, non-real time, and a wide variety of forms known now or in the future. Note that database 510 may incorporate a wide range of possible data formats, mixed formats, and may include data that is contained at various locations, by various suppliers or vendors. That is, while a MySQL format may be the preferred format for storing data in the database, nothing is meant to limit the way in which the database is formed, as it is understood that the database may comprise a wide range of different sources and formats of data, and in fact the database may be distributed geographically, and provided by many different sources and vendors, such as through Akamai for caching/storage, Rackspace as a web host, and public websites which are accessed by the clearinghouse to provide on-demand or cached versions of public data. This patent intends for the database 510 to include data that may be retained in current and future data formats that may not be known today, and it is understood that various methods for storing/archiving, modifying, and retrieving data, which includes the use of software that is run by the Clearinghouse CPU to provide hooks into/interact with other computers which may control access to external databases, as well as data maintained or owned by the clearinghouse itself, may be contained in database 510. Furthermore, the database may be populated or edited by various sources, including people who are remote or employed by third parties, and web crawlers that may or may not be under control of the Clearinghouse computer 30. Human intervention, to vet or approve data that comes from internal and external sources, may also be used, and the entry of human-approved data may also be included in the database 510.

When matches to the desired needs of the carrier are found in the database containing end user records, a "hit list" of all potentially available properties or locations that are deemed suitable is constructed by the applications. The computer then may implement the email application to send an email to the carrier 10, and optionally also to the end users 12 (depending on carrier preference), or alternatively, the web application may be implemented to provide the "hit list" in web viewable format available to the carrier 10 when they are logged in to the Clearinghouse 16. In this manner, the Clearinghouse 16 may over time allow the carrier 10 to be automatically notified when new end-users 12 offer dwellings for use, either by email or by on-screen notification when they log on or through a messaging feature.

Furthermore, the computer may run the selection/optimizer application 34 on occasion or periodically (on an hourly/daily/weekly/or some other time basis or on a random basis) where the application 34 uses inputs by the carrier 10 that are stored in the Clearinghouse 16. The interval may be determined by the clearinghouse provider 16, or may be selected by the carrier 10, perhaps with a premium being charged for searches that occur more often. The clearinghouse computer 30 preferably runs a computer program or subroutine, or groups of programs or subroutines that may be running in many geographically dispersed locations under control of the clearinghouse, or perhaps on various vendors/suppliers/subcontractors computers as well as on the clearinghouse computer 30, that systematically checks the carriers' needs with the end-user offerings (which are stored and processed using the end user record application and the sorting and parsing application 36). FIG. 4 shows a flow diagram, where the computer reads the carrier records 410, and uses the specified data by the carrier to check all of the records in the database attributable to end user records 412. Note that end user records 412 are understood to also include public domain records available from public databases, or from data sources not provided by end users but which are blended with the end user records for sake of the applications being run at the Clearinghouse (e.g. Google Earth may have WiFi hot spot locations, and this information may be included along with end user records that have been provided by citizens to the Clearinghouse). Note that a user of the Clearinghouse may specify the option of including or excluding various public domain databases from the end user database processing, so as to distinctively identify and process only true end user submissions in the various applications. The sorting implemented by the computer to find the carrier needs may be done in any number of ways which are well known to those skilled in the art of computer programming and database sorting. Zip code sort, price/leasing terms sort, physical building type or land use sort, or past history or profile of the end user herself might be used to determine "best" sites that exist in the end user database. As shown in FIG. 4, after entry into the clearinghouse 414 and checking of the availability of locations 416, algorithms at 418 that compare the end user database to the carrier needs may include the RF engineering application 29, which provides for RF propagation prediction coverage mapping in determining whether a particular end user entry satisfactorily meets the carrier needs. Alternatively, no RF propagation may be used, where simple straight line distances, crude address matching or simple text string matches on zipcodes or street addresses, or even county addresses or GPS coordinates (Lat/Long.) are used to determine good matches in the database during the computer controlled sort. The carrier may establish one or more criterion for rank ordering the end user sites, such as based on fee wanted by an end user, the RF coverage of each end user location, the land use or type of property being offered by the end user, or if there are carriers already using the end user site. A hard or soft limit on what should be and should not be deemed suitable may be specified by the carrier, or may be preset by the Clearinghouse in order to manage database sizes and CPU time. A rank ordered list of properties is presented to the carrier at 420, either by email, by a web page hosted by the Clearinghouse specifically for the carrier, or by fax, mail, cellphone alert, or some other known method. Note that the rank ordering may be done in a wide range of methods, where close proximity to the carrier needs may be one rank, or lowest cost end-user access may be another, whereas the ranking may be based on a carrier's preset priority for properties that it needs (e.g. to fill an urgent customer request in a particular location. Alternatively, there may not be any ranking done by the Clearinghouse, leaving the data in an unsorted form for the carrier or third party to analyze on its own. The Clearinghouse may also alert the end users as to potential interest by the carrier at 422, if the carrier indicates in its records that it wishes for the Clearinghouse to do so upon finding a match (this may be done using a canned or prepared message by the carrier in order to entice interest by the end user). The sorting in the Selection Optimizer application may be run over and over again, as often as needed, and alerts may be issued by the Clearinghouse for just new hits, or the most recent several hits, or the entire rank ordered list. Pricing may be instituted to offer premium or basic notification and search results. Interest by the end user can be confirmed by a responsive message by telephone, e-mail or web posting at 424, and non-interest can be provided similarly at 426, which presumably results in a return and rerunning of the search processes. The sorting process may also include a check of zoning and other ordinances at 428 that may have a beneficial or negative impact on the suitability of any particular end user's assets by the carrier.

Alternatively, depending on the business model, the clearinghouse may be implemented without a subscriber model, where carriers and end users access the clearinghouse for no charge. In either case, the carriers or end users may simply be given unique ID's or clearinghouse names using the credit card/password application (their unique ID may be their email address, or a customer-specified log in name), and in any case, these customers are provided passwords (that may either be specified by them, or issued by the clearinghouse) that allows the end users and carrier customers access to the clearinghouse. The various access permissions allowed to each class of user of the clearinghouse is preferably managed by the access to web manager application 33.

The clearinghouse allows its users to connect over the myriad of connections, such as phone, internet, email, etc. The clearinghouse is preferably connected via the internet to allow dissemination of its content over the worldwide web, so that the public can gain access and view/use the information contained in the clearinghouse. The content of the clearinghouse is stored in a wide range of forms, such as databases that may be within the computer, databases that are located outside of the computer, in applications that may be run or managed by third parties, and may include public domain databases and information from links on the worldwide web.

Some of the information may be modified or viewed by different users. For example, and with reference to FIG. 2, carriers may view the records of all end users 210 to help the carrier see what opportunities exist for it to locate its equipment, and the carriers could also use the clearinghouse to indicate its own desires, needs, interests, and problem areas where they have need to find locations for equipment in the carrier records 212. In one embodiment, other carriers, end-users, or the public users would not be privy to the carrier's specific desires or needs, but the carrier would be able to use these records. End-users may use the clearinghouse to enter their data, expressing their interest (an offer) in having their dwelling used by carriers. In one embodiment, other end-users would not generally be allowed to see the offers of a particular end-user, but carriers would be allowed to see it. The storing, parsing, controlling, and organization of end-user records 210 is done by the sorting and parsing applications 36 used by the clearinghouse (shown on right of FIG. 1). The construction and creation of software applications to do this are well understood, and this could be internally developed by the clearinghouse staff, or developed using well known third party programs.

All users, including public users could use the clearinghouse to view various zoning/covenants affecting their own neighborhoods. Users can preferably submit records, documents, plat maps, zoning ordinances, or provide web links thereto, by accessing the Clearinghouse and using one of the applications dedicated for such locationing and mounting or linking of records in the Clearinghouse. Thereby, all users of the Clearinghouse can readily access public records 214 in an easy manner, such as key documents, zoning records, or other public ordinances surrounding telecom regulations in their specific location, neighborhood, country, or city, etc. Such records can be mounted in the Clearinghouse and sorted using either Zipcode, city, county, township, state, country name, whereby applications allow the documents to be retrieved and stored in a manner that makes them easily retrievable and accessible by users of the Clearinghouse. For specific classes of users, such as end users and carriers, for example, lease agreements, which provide for the business and legal terms for a legal contract between an end user and one or more carriers, may also be available for download, execution, and upload between parties, where the Clearinghouse serves as the agent that provides this capability. By law, some documents may need to be notarized or faxed, instead of uploaded, but the Clearinghouse could nevertheless provide the appropriate legal documents and store them, crossing the transaction between the parties, and may also participate in a commission, either one time or on going during the lease of the end user property. Carriers and perhaps even end users could provide the Clearinghouse with a small commission, on the order of 2 or 3%, for the monthly rental charge paid by the carrier to the end user, and this could be automatically deducted from credit card or electronic banking funds, or other means known now or in the future.

Note that some documents may be uploaded to the Clearinghouse by PDF or other well known document formats, or may simply be pointed to using URL addresses or other techniques known now or in the future. Services such as Google or webcrawlers or web bots may also be used to provide the clearinghouse information, through end user records 210, carrier records 212 or public records 214 as shown in FIG. 2, and in many instances a particular map or document might need to be categorized under a state or national as well as local category. The Clearinghouse computer could maintain this data in its own storage facility (e.g in its own internal database), or rely on the web-based storage of other websites as part of its overall database 510 (although this latter approach may mean some data disappears or becomes incorrectly pointed to over time).

FIG. 6 shows a number of the same elements as FIG. 1 including the computer 30, display 44, internet connection 38, as well as a variety of applications 28 for covenants and/or plat maps, city planning and zoning ordinances and neighborhood covenants, Google Earth, GIS or other mapping applications, forums and exchanges including chat features, education and customer content, re-engineering applications, and proprietary or public RF Design. FIG. 6 also shows customized advertising or web content provided to homeowners or other end users 610 and carriers 612. Carriers, end users and public users may access the Clearinghouse with phone banks, web servers, telephone operators (either its own phone operators, or through a leased or rented call center, or using a $3^{rd}$ party provider for telephone answering services), automatic speech recognition devices (not shown), voice mail, or digital recorders and email servers. Note that some or all of these may be used in an actual embodiment, and it is understood that other embodiments other than the one shown could be used, based on the cost or preference or technology or rollout of the Clearinghouse. It should be clear that not all applications shown in FIGS. 1 and 6 would need to be installed or used at once, and one skilled in the art can envision different applications, or different approaches to organizing content, or subsets of the applications, or a merge between some of these applications could be implemented over time, while keeping in the spirit and intent of the invention.

Given the aggregation capabilities of the Clearinghouse, advertisers, attempting to focus on various customer segments, can preferably provide advertising to the various users of the Clearinghouse, either through email, the website display, through voice mail and video/multimedia services when users access the Clearinghouse, and through regular mail, based on the address records contained in the end user records and carrier records applications. Web advertising is an emerging business, and the Clearinghouse would serve as a highly targeted and useful medium for advertising over many domains, given the new capability and targeted clientele afforded by the present invention. The email application may also be used by the Clearinghouse, itself, to send email alerts to users of the Clearinghouse (e.g. to end users or carriers, or to the public which has registered their email with the Clearinghouse), and the web application may be used by the Clearinghouse, as well, to provide web postings to specific users who are allocated specific web addresses or password protected access for confidential or specialized data.

FIGS. 1 and 6 show the Clearinghouse also supports forums and exchanges, where end users may communicate with one another, where carriers and end users may communicate with each other, and where carriers may meet and communicate with each other. This may be provided using chat facilities, instant messaging, VoIP, or web posting, as well as other forms of peer-to-peer and peer-to-group hosting applications. The archives in this portion of the Clearinghouse will help others in gaining knowledge and understanding of the clearinghouse and the needs of the telecommunication industry, carriers, and end users in general, thereby providing valuable insights for a growing customer base. In addition to the forums, FIGS. 1 and 6 show the Clearinghouse serves as an educator, a trusted resource that provides content, links to important telecom rulings and happenings, and provides open content for the world to access. This education/content application allows the Clearinghouse to also publish, either in print, email, or web, or podcast, or broadcast form, newsletters, information pieces, and promotional pieces that may advance the needs of particular carriers or segments of the telecom industry.

Access to carriers and end-users as described herein allows the Clearinghouse to be private labeled or OEMed by particular carriers, or by particular intermediaries in the infrastructure industry, or entities, such as the American Radio Relay League or JARL, which has many constituents who own towers or have interest in advancing telecom in general. By creating a private labeled enterprise or user class web presence or print presence, the knowledge and content of the Clearinghouse can be dispensed to particular groups of customers or end users, for the benefit of the industry or for the benefit of a particular carrier, intermediary, business, or industry segment. Thus, the knowledge contained by the Clearinghouse may be distributed in many different ways in parallel. This perpetuates the growth of subscribers or users of the Clearinghouse, while serving an unmet need which would benefit many carriers or organizations, particularly small and medium WISPs, citizens in general, expanding telecom providers in rural or emerging lands, large carriers looking to roll out "small iron" infrastructure, and large and small telecom companies that realize that the clearinghouse is a less expensive resource to promote their own technology or their own presence or needs.

In addition to the abilities mentioned above, the computer provides the Clearinghouse with the ability to allow a carrier to exploit the end-user information in order to identify locations or dwellings where end users will allow it to install equipment or towers, etc. Without divulging the needs of the carriers, or the entire contents of the end user database, the Clearinghouse may allow the general public to view its own local areas of interest, say through zip code search or street search, to see who in their community is offering site opportunities. Of course, the end user must first have opted to have his or her listing made public for the general public to be able to see it, which is an option that may be provided when end user records are provided to the Clearinghouse. By viewing local listings, the community may validate that the listing, the map, and description is good—generally people in the same neighborhood will be interested in seeing if it's the right plat map, the right link, etc). If made public by the end user or carrier, or clearinghouse, neighbors may also be interested in the remuneration provided to the end user from one or more carriers. The Clearinghouse preferably would allow the general public to rate the quality of the postings (for example, one to five stars), and to provide customer feedback, thoughts on the experience, etc. (social commerce and word of mouth). Everyone who uses the Clearinghouse website would optionally and preferably need to have an assigned account or screen name so they can be credited with finding and posting info/data, and get ranked by the community.

In one embodiment, the Clearinghouse allows carriers or intermediaries to have a look at all end user offerings without giving away what the carrier wants or needs. Carriers may list their standard legal and business term agreements and have the ability to use the Clearinghouse to see readily if there will be local ordinance hassles, neighborhood hassles, limitations due to covenants, as shown in FIG. 4 and as described above. Letting the end users and the public post this information, on a zip code or neighborhood by neighborhood, county by county, township by township, sq mile by sq mile basis, is best, as these maps for the boundaries exist.

Ham radio operators already have towers and are technically savvy, often ready to help with the provisioning of broadband. The Amateur Radio Relay League, (ARRL); Japan Amateur Radio League (JARL), Radio Society of Great Britain (RSGB), etc. would likely have interest in hosting or rebranding the Clearinghouse to its own purposes and for its membership, possibly as a revenue generating opportunity for its own society and as a service to its ham radio operator members, who often have towers and have already taken care of the zoning issues in their own neighborhoods. Amateur radio towers are often exempt from tower restrictions due to the common good and emergency preparedness that amateur (or "ham") operators provide to society. The lower profile ("small iron" footprint) of today's wireless telecom equipment, such as WiFi, WiMax, and much of the emerging broadband wireless infrastructure, does not require bulky cell towers, and can readily be installed on most ham radio towers today. The invention will allow carriers or intermediaries to immediately find these hams and offer leasing terms, so that the carriers may approach this community for potential tower sites. This helps quicken the deployment of wireless without the need to erect new towers or to go through extensive zoning hearings. Increasing the time to build out coverage or capacity is very valuable to a carrier, and thus the carrier would likely pay to have access to the Clearinghouse.

Record Forms shown in FIG. 3 are submitted via web or submitted by voice, email/touch tone, data entry/handwriting, fax, and other electronic means known now or in the future, including file transfer, etc. The forms reflect data shown in FIGS. 2 and 3, which is processed, sorted and parsed by the sorting and parsing application 36, and stored in the Clearinghouse database 510 (FIG. 5). The data preferably indicate where the end user is physically located, and whether the end user has a Tower, or places on roof, house, building for antenna mounting or equipment mounting, etc. For example, either through entered data by the end user, or through public access to records that augments the end user provided records, or from file transfers from third parties, the carrier or third party uses the clearinghouse to determine answers to questions such as: Does the end user have to be on site when telecom company comes? Does end user have power or utilities available? Does end user want maintenance of tower/building? Will user want cash, cash rebate, or free internet or phone service? Does end user own the land or rent? Is user aware of any zoning or limitations, neighborhood covenants that would prevent stuff going up, if so where? Does the owner have insurance, and what liability insurance is needed, required, on hand? Has end user successfully leased to a carrier before? Is the end user a ham radio operator or technically minded? Can cabling be buried on the premises? How close is the end user to other towers included in the end user database or public databases? What is the value of end users home, as identified by tax plat public tax record database, and is it a single family residence, apartment, commercial building, etc.? What are the desired business and/or legal terms to do a lease transaction, and what is the first/best/desired offer. These types of data would be linked in with town/country records of public land, and further linked with Google maps or another mapping technology, so that end users and or carriers or third parties could view potential locations with a vast amount of information contained in the Clearinghouse database.

Of course, some end users may wish to negotiate for deal terms on leases to carriers, in which case the Clearinghouse can provide the forum for an electronic negotiation, or an auction, where a carrier may find a potential site of interest, notify the end-user through email about their interest and with a first offer, and then wait for a reply from the end user as to how to move to a final negotiation and signed lease agreement. Alternatively, the end user may have an idea of their initial business terms, and this may be provided in the end user's provided records. All of these steps are handled by the Clearinghouse and its applications as described above, preferably through the worldwide web, or by other electronic interface means.

Using the Clearinghouse for Radio Quality and Service for Wireless Devices

As described above, the Clearinghouse provides a database of tower locations provided by end users and carriers, and further provides for the ability to access public records such as governmental tower databases and frequency planning rules and regulations. Thus, it is clear that the Clearinghouse is able to maintain information about more than one carrier, and in fact can store information about every publicly disclosed tower, as well as the inventory of towers provided by end users, as well as infrastructure information provided by multiple carriers. Data such as transmitter frequencies, antenna heights above ground, owners of spectrum, leaser of spectrum, type of license, date the license expires, type of services offered, may all be cataloged and stored in (or accessible to) the database in the Clearinghouse so that there exists, on the worldwide web at the Clearinghouse website, a position-tagged listing of wireless assets for multiple bands, and multiple carriers. This web site may be private access (password/subscriber protected) or open access to the world, depending on the desired business model.

Given that the clearinghouse is coupled to the internet, the Clearinghouse database can be used for cataloging the wireless availability (signals, bandwidth/capacity, services, carriers who provide service, quality of offered service, over multiple bands and for one or many carriers and services that are available to a particular wireless device in a specific location or locations on earth. Furthermore, the Clearinghouse may average, smooth, or provide best/worst/average estimates of the quality of wireless service, and its availability, based on the on-going measurements reported by end users and their devices at various parts of the globe. Thus, the Clearinghouse becomes an archived record of wireless quality at various locations, and this record is included in the clearinghouse database and updated or refreshed under computer control as described in FIG. 5. This invention can be extended to work for different kinds of wireless devices, for example WiFi LANs are different than cellular/WiMax/LTE networks, so this Clearinghouse capability could be available for each type of service, or providing information for all services in a single clearinghouse.

Figure 7:
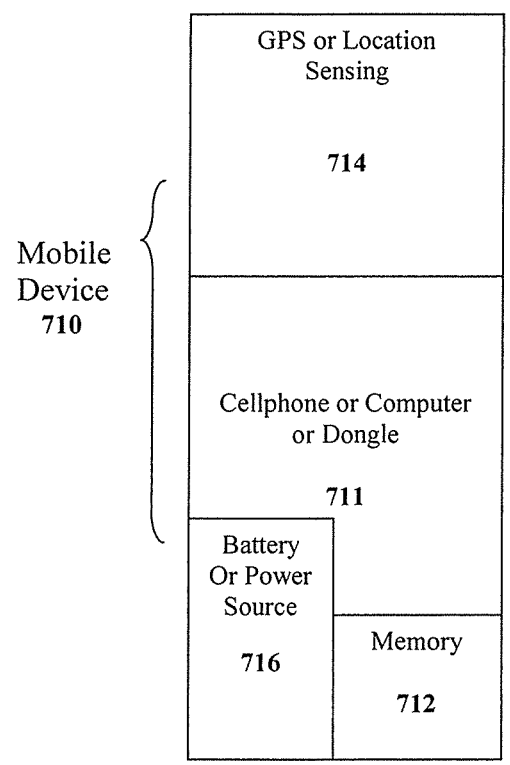
FIG. 7 illustrates a mobile device and how it may be connected by wireless or wired means through the worldwide web to the clearinghouse.

The inventor envisions a clearinghouse that can be used/updated/accessed and built upon, by individual's experiences in accessing wireless connectivity across the globe. As shown in FIG. 7, the reports of RF quality and capacity are preferably done by the end user or the end user's device, where the user of the wireless device, or the wireless device 710 itself (as shown in FIG. 7), reports to the web Clearinghouse its experiences over a wide range of bands, frequencies, providers, and services. The wireless device 710 may be capable of voice, data, multimedia, and/or wireless call connections. Web connections could be in band, the same channel as current wireless "call" connection or out of band, or different channels than the present wireless call. Note that the coupling of the mobile device 710 to the internet (e.g. the Clearinghouse website) is done over the wireless call connection. However, this coupling may also be done over a wired means as described below, or may be conducted at a different time or location using a different wireless carrier or frequency than used for a wireless call or interne session. While not shown explicitly in FIG. 7, another embodiment of this feature of the invention would be for the base station or fixed infrastructure of a wireless network (and not the wireless end user device) to collect measurements or performance metrics over a wide range of spectrum for the quality of RF coverage, capacity, and overall communications quality, on either/both the forward and reverse wireless links, and to provide that data to the Clearinghouse via worldwide web connection that is often provided at the base station or fixed infrastructure. Of course, both the fixed infrastructure and the mobile device could collectively and cooperatively report back data to the clearinghouse, as well as receive data from the Clearinghouse.

Preferably, the end users phone 710 would report its observations to the Clearinghouse in an automatic manner without ongoing user control and even without knowledge by the user. Indeed, phones or wireless mobile devices 710 of the future may be simple dongles, computers, and a wide range of wearable or sensor devices 711 that may access the Clearinghouse in real time, or prior to a wireless phone call, or intermittently during or after a call, while the mobile device 710 is idle, or even when the cellphone (e.g mobile device) is off or not in use (but connected to the interne by wired means). That is, the memory 712 of the wireless device 710 may store the measurements and observations of various radio quality and performance metrics, for uploading to the Clearinghouse using any type of connection to the worldwide web—wired or wireless, not necessarily just during a call or during travel. These measurements will be paired with geographic location information obtained uses a GPS or any other location sensing or position estimating techniques 714 that may involve an onboard computer (not shown) in the cellphone or computer 711, or external to the mobile device 710, such as through infrastructure position location methods. Thus, the Clearinghouse is able to continue to build a database that is built upon location-specific reports of radio coverage, services, carriers, bandwidths, and past user experiences, even when certain mobile devices must wait to report their observations (due to poor coverage, priorities of the device or user in providing communications, or when battery 716 is too weak to justify accessing the Clearinghouse at certain times). FIG. 7 contemplates a mobile device 710 that is able to access the Clearinghouse via the worldwide web, in order to query or determine information, in either real-time or non-real time, about the radio environment and performance quality in its particular location. This access may also be in real time or non real time by either wireless or wired means.

Figure 8:
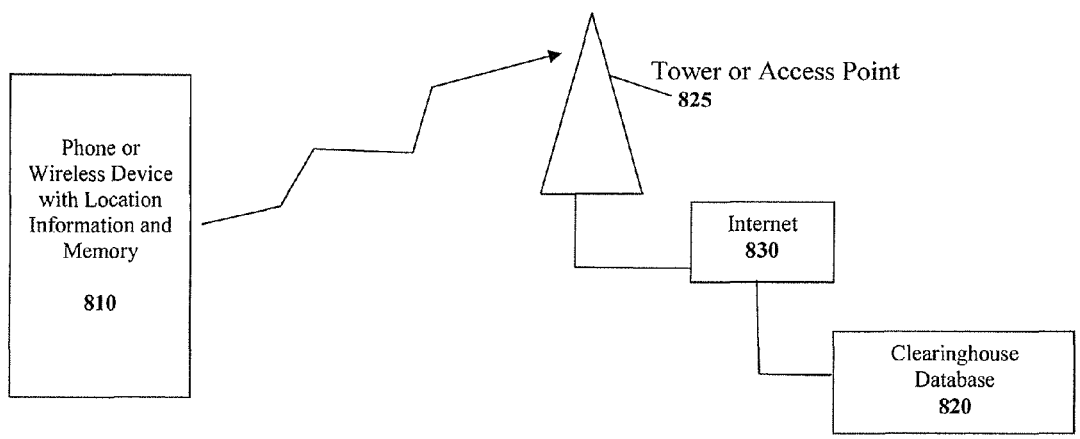
FIG. 8 illustrates a mobile device and how it may report its observations of its location, as well as network quality and the available spectrum back to the clearinghouse.

As shown in FIG. 8, using the invention described herein, a wireless device 810 is able to couple to the Clearinghouse website (and consequently the Clearinghouse database 820) through its wireless carrier to automatically provide (e.g. upload) its readings, measurements, or observations to the Clearinghouse, either in a batch (stored) method, or periodic, intermittent, or random update method, using either wireless 825 or wired connectivity to the internet 830, and is also able to access the Clearinghouse database (e.g download) to determine general information about the radio environment (to help optimize the battery use, RF radiation, or mode/data rate selection of the mobile device) or to find what channel to tune to, what carrier to use, or what services to expect or access, without wasting transmit power, battery life. Thus, the Clearinghouse can both rely on data provided by wireless devices at various locations in order to provide data that allows particular inquiring wireless devices to adjust their access techniques to the wireless channel in a certain geographic area in a manner that matches the specific coverage/RF/quality of the location. While FIG. 8 shows a wireless connection, the device 810 could be connected by wired/optical connection through the Internet 830 to the Clearinghouse database 820. Note that location information may be provided by the mobile device 810, or may obtained through an external or alternative means, perhaps from the carrier's infrastructure, or through other methods.

Figure 9:
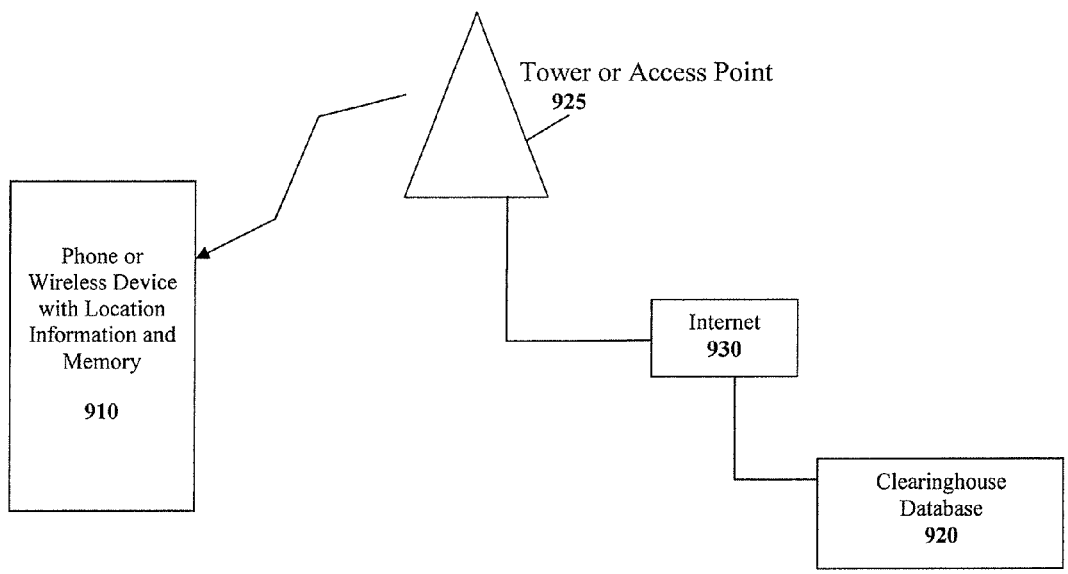
FIG. 9 illustrates a mobile device receiving information from the clearinghouse so that a mobile device may be manually or automatically configured for improved wireless operation.

The network performance or quality of service information as a function of location may be downloaded to the wireless device from the Clearinghouse either before a user of the device travels to a location, or during the travel, itself, as illustrated in FIG. 9. While FIG. 9 shows a wireless connection, it should be noted that clearinghouse information may be provided to the mobile device 910 using wired means, as well. FIG. 9 is substantially similar to FIG. 8, and shows the flow of information from the Clearinghouse, and consequently the Clearinghouse database 920 to the wireless device 910 through the Internet 930 and Tower 925. As shown in FIG. 9, recent snapshots or data values of quality as a function of location, as obtained from the Clearinghouse, may be stored in the memory of a mobile device 910, and updated at a rate determined by either the Clearinghouse, the end user, or the wireless carrier providing end user service. When in the field with a planned trip, the user can get downloaded information after handshake by the wireless device 910 being able to retrieve from the Clearinghouse 920 (in an automated fashion or with a user interfacing interval) the local "state" of the RF environment he or she is in or traveling to which may include the services that are available, carriers, locations of towers, etc., so that the phone can use power and allocate spectrum better. This handshake may be provided over the air in real time or pseudo real time, or may take place earlier when the phone is connected or idle at home in a wired or wireless home network, or docked in its charger, etc.

Figure 10:
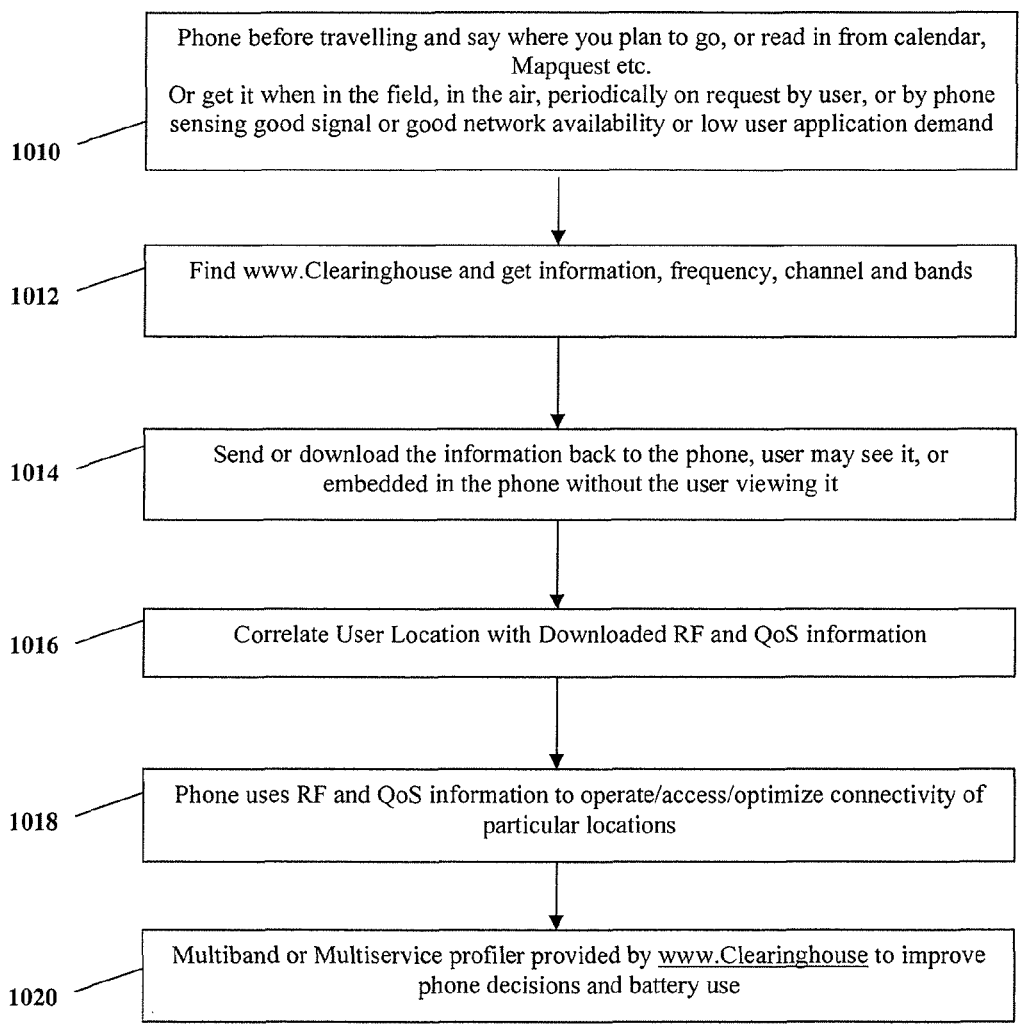
FIG. 10 shows a flow diagram of how a clearinghouse works with a wireless device, such as a cellphone, to enhance wireless performance at the wireless device.

FIG. 10 shows a flow diagram of how the Clearinghouse and mobile device work together to provide enhanced service for the wireless subscriber end user. The network quality information, and relative ranking of carriers, frequencies, or selected power levels or data rates/modulation types as a function of location may be downloaded from the internet at steps 1010 and 1012 (e.g. Clearinghouse website) before leaving for the trip, where the position location coordinates are obtained prior to the trip path from Google Map, Mapquest, or some other path finding method that allows for interpolation or storage of position coordinates, and these position location coordinates are stored in the memory of the mobile device. Alternatively, if implemented in real time or in near real time during a trip, the mobile device may use a road navigation system in the car, a navigation application in the phone, or GPS in the phone in order to determine its position location as shown at step 1010. The wireless device thus has latitude/longitude or GPS coordinates, either measured by GPS or by its own navigation application, or as interpolated or as stored from a pre-planned trip route stored in memory. These locations are then provided by the mobile device to the Clearinghouse at 1012, (note that the locations provided by the mobile device to the Clearinghouse could be determined on the fly as the user moves with her wireless device on the trip, either in band or out of band, across a wireless network during the travel.) The Clearinghouse, based on the locations presented by the mobile device, provides to the device specific performance or quality of service metrics or rankings, such as desired frequencies, best or rank ordered list of carriers to use at each specific location, preferred modulation types, upper or lower limit on data rate, upper or lower limit on bandwidth, or a ranked listing of available (in the area who provide service) wireless carriers at the various interpolated locations at step 1014. This information may be transparent to the user of the mobile device, as shown at step 1014, and may match a user profile, such as "highest download speed", or "cheapest cost" or "always pick Verizon if it can give me better than 10 Mbps", which the user may have programmed on his cellphone or programmed through his wireless carrier through a website or in the store upon purchase or renewal. Alternatively, the information provided by the Clearinghouse may be visible to the end user, as also shown at step 1014, either over the wireless device, or at the Clearinghouse website, provided the end user is a participant of the Clearinghouse. In this manner, the Clearinghouse facilitates multiple-carrier operation at step 1020 and may provide network enhancements over a wide range of spectrum for a single user, which will be required if federal regulations require an open spectrum policy where various carriers must support traffic by users of a specific carrier network. Such operation enhances battery life and improves phone and network performance through control of interference, spectrum usage, and power, while being impartial to any one particular wireless carrier.

Given the location (whether actual or estimated) of the wireless device, and information of the radio frequency (RF) quality and coverage and the services and bands available for access are identified at step 1016, the wireless device may make good decisions at step 1018 as how to access wireless in the particular location, thereby saving battery life, cost, time, or improving connectivity for the particular desired application used by the user of the wireless device. The Clearinghouse/database on the web would communicate to wireless devices either in real time over the web, or prior to the wireless device going to a location, with information that allows the phone to determine the best or $2^{nd}$ best (or a priority/ranked list) of frequencies, or carrier providers, or services, or bandwidths, based on the customer's predetermined desires/needs (lowest cost service, highest data rate service, longest battery life service, etc). Or the user may adjust their desires for service priority on the fly as they travel and learn the quality of the networks they are in. This may be done automatically (with preset user settings) or may be visible/shown to the user through an application on the web or via the wireless device. Note that the carrier/service provider, or the wireless device manufacturer, or some other party, may also set the priorities for desired service based on price, availability, instant channel loading in the network, or other factors.

In fact, the world's RF/QoS/coverage/service map could be loaded on to a wireless device from the web clearinghouse, and the updated periodically or infrequently, at either the request of the phone user or automatically by the wireless device, to update the database of the RF/QoS/services, capabilities over location.

The phone/wireless device could access the web either through a user application or this could be done autonomously, where a web server that hosts the clearinghouse communicates over wireless or wired means with the wireless device. This can be done using low level formatting that would not be readable by a regular user, but which is loaded into memory of the wireless device.

The web server and clearinghouse may be central or distributed, and can store and represent the services, locations, frequencies, carrier/owners, and other information that would be useful for a wireless device to automatically determine what frequencies or applications or capabilities it might experience in a particular location on the globe. Global coordinates may be represented in many ways known to those skilled in the art, and the ability to autonomously access the web is well understood today.

Figure 11:
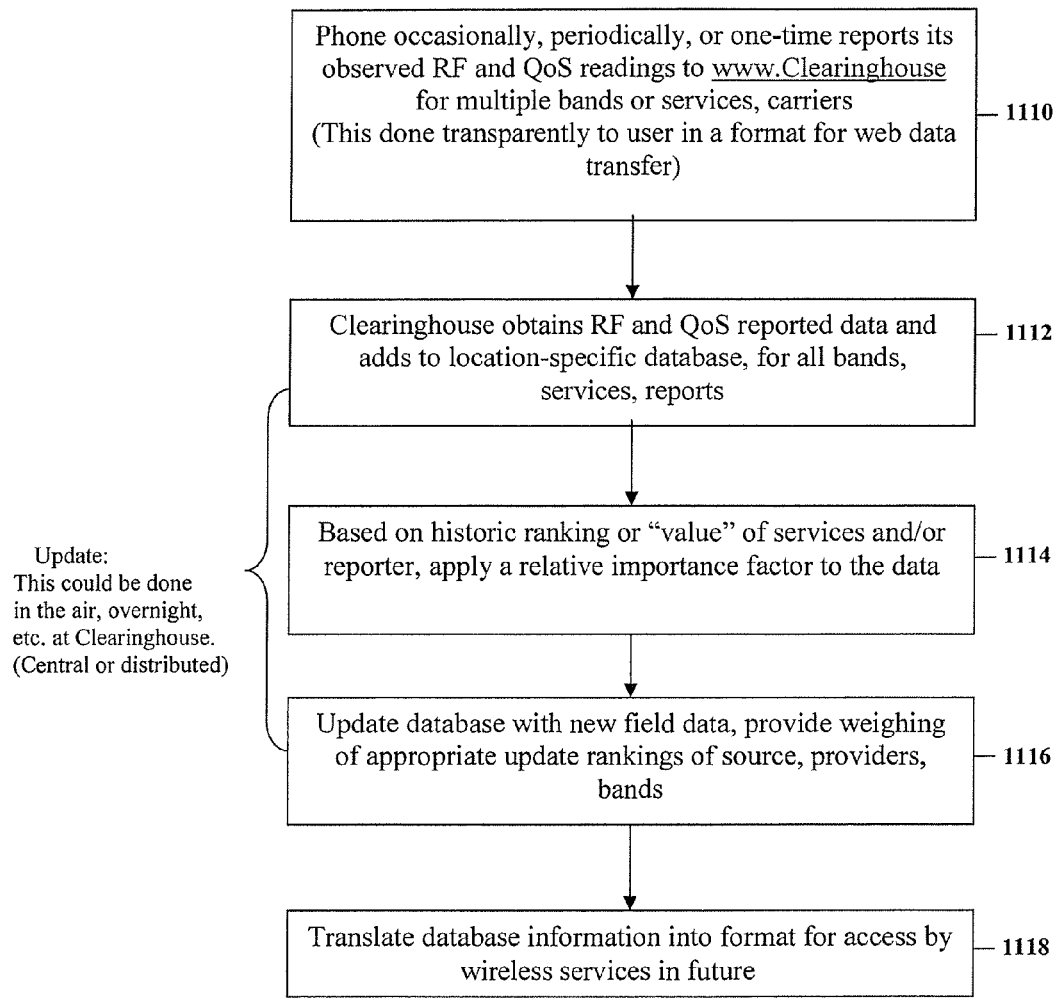
FIG. 11 shows a flow diagram of how the wireless device reports its observations to the clearinghouse for ranking of possible wireless connection options, and updating of knowledge of wireless environment at the clearinghouse.

Users may also, either by their own activities, or through the wireless device autonomously either known or unknown to the user, communicate updates or in-the-field readings of the various signals and capacities/bandwidths received by the wireless device in a particular location back to the clearinghouse. That is, wireless devices may report back (autonomously in a preferred embodiment) to the clearinghouse their user experiences over a wide range of frequencies, bands, applications, along with the location of the wireless device. FIG. 11 indicates a flow chart that shows how a mobile device provides information to the Clearinghouse, and how such information is applied to the location-specific database maintained by the Clearinghouse. The idea of using GPS or some other position location means, even if as crude as sensing what major tower or market or carrier signal or nearby TV or FM or AM transmitter, etc. is received by the wireless device (crude position locationing) could be used, as could more accurate TDOA or GPS methods. In any case, the invention contemplates the ability of users to report back to the Clearinghouse in step 1110, either in real time or when they become located where network access is easy or free, the measured quality and coverage and capabilities of wireless in a particular location/geographic region. The courseness of the geographic region may be determined based on speed of user, the application used by the user, or set by the Clearinghouse, or by many other methods. Similarly, the courseness or the position location may be specified or set by the Clearinghouse, and more value or cost or premium preference may be given to certain subscribers or users of the Clearinghouse who wish to have more accurate (fine resolution, say within a few meters, few hundred meters) of wireless spectrum quality/ availability than those who are satisfied with course position locationing (say a few thousand meters).

The measurements reported back to the Clearinghouse by wireless users are added to the location specific database in step 1112, and just like the obtaining of various radio qualities and metrics for a particular location of the wireless user, may also be done without knowledge by the user, and may be done in an autonomous communication between the wireless device and clearinghouse.

This database can also be contributed to by users who wish to add/record their own experiences, either autonomously or manually through a public website offered by the Clearinghouse. Carriers could enter their own database into the web clearinghouse, or the clearinghouse could use bots or automated web crawlers to find websites from FCC, Chinese government, private or public company websites, Comsearch, etc. to build a large database of spectrum availability and tower locations and bandwidths/services with a common website. Note that this Clearinghouse could also have users provide inputs as to their perceived or experiential views of radio coverage or phone/web quality at step 1114 when they were in a particular location. Note that the entry of this "performance" data could be added by users based on their own experience, and could also be provided by carriers based on their known infrastructure locations. Alternatively, phones of the future, equipped with GPS or any other type of location capability, could automatically, without any human interaction, upload to the website, on a periodic, one-time, infrequent, or regular basis, the perceived/measured radio reception quality, bitrate, capacity, availability, average use profile, average available profile, statistics on outage or reliability or coverage or capacity carrying capabilities, or an evaluation of the RF or end-user application performance, and this information may be loaded to the Clearinghouse for inclusion in the database that is available. The database is updated at step 1116 at various intervals that make sense for the implementation of the Clearinghouse (daily, hourly, by minute, by week, and this may be done on a global or on a specific location basis across the clearinghouse database, that itself may be distributed or located centrally). The updated information is made available to users on an ongoing basis, for further utility and enjoyment.

Reporters of RF quality and quality of the services, and access to the clearinghouse may be shared between carriers, user populations, owners, etc. so that information may be made available to update the global clearinghouse while providing those updates to large numbers of users who own wireless devices, for the improvement of operation of the wireless devices, or benefit to the carrier(s) or to the customers of wireless devices or customers of the wireless service access.

Once this clearinghouse is created, then future phones or wireless devices could access this Clearinghouse web site at step 1118, either conducted by the person who is the subscriber, or automatically by the phone device itself, or by the carrier or service provider, and could even be accessed by the application running on the mobile device that is intended to be used at the specific location, and over a wireless channel, to rapidly determine the type of coverage/quality of coverage, the various vendors in the geographic region of the user, how to best send the message, how to conserve bandwidth, improve battery life, etc.

Figure 12:
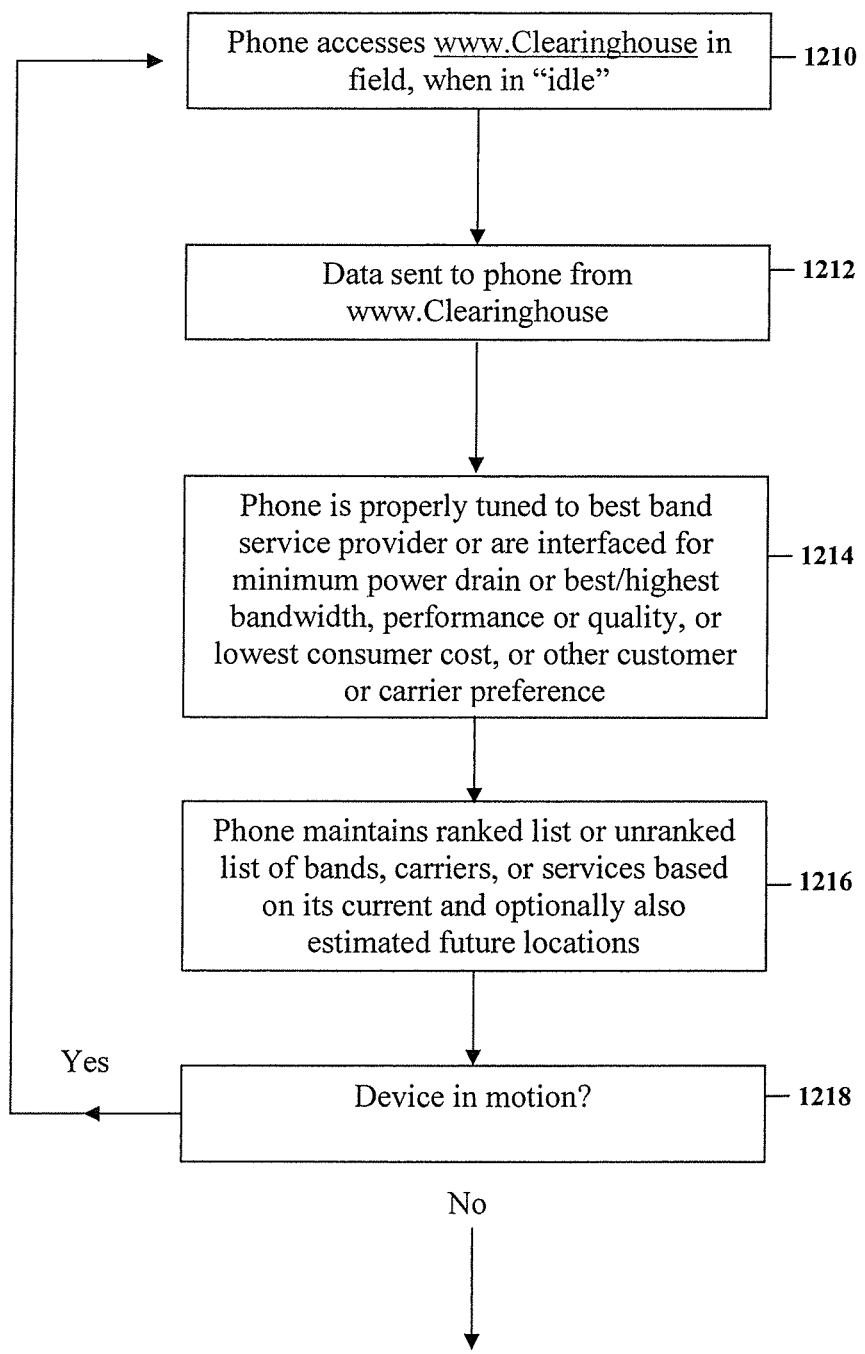
FIG. 12 shows a flow diagram of how a wireless device is able to receive updated information about its operating parameters, based on the knowledge of the operating environment by clearinghouse, so that the wireless device may be sent instructions that cause the wireless device to be automatically tuned to appropriate frequencies, air interfaces, and other operating parameters to provide enhanced operation for the particular wireless device, or the entire network.

FIG. 12 illustrates the flow diagram of how a mobile device may access the Clearinghouse, whether in the idle mode, or during a cellphone or internet session, or whether connected to the internet via wireless or wired means. The mobile device is able to use the Clearinghouse-provided rankings of best service providers or air interface specifications and observations in order to enhance or optimize its own performance. This may simultaneously correspond to enhanced performance of the entire network that the phone is operating in. The wireless device is able to maintain a ranked list of preferred operating modes and carriers or services based on its current location, as well as estimated future locations, as it provided to the Clearinghouse. Future locations may be determined from past records maintained in the phone itself as to where it often in use (using past position location measurements), or future locations may be determined by the carrier, which may provide intermittent measurements of an end user's location. Alternatively, the Clearinghouse may maintain records of past usage and location information of particular end users, through low overhead wireless internet connections or through batched (stored) records from particular wireless devices.

The exchange between the end user mobile device and the Clearinghouse's worldwide web address (e.g. IP Address) requires a handshake so that users may be properly identified and properly monitored and controlled uniquely by the Clearinghouse at step 1210. Thus, there is a negotiated password/access that must take place whenever the mobile device attempts to connect with the Clearinghouse, and vice versa. This may be facilitated through the credit card sign up and password management application of the Clearinghouse, or may be a separate application under computer control. The end user's Mobile ID number (MIN), Electronic Serial Number (ESN), or some combination of data using one or both of these numbers may be used for registration/access to the Clearinghouse, and so that mobile devices may be identified uniquely through over the air or web-access data exchanges. Once identified, data can be sent to the phone from the Clearinghouse at step 1212, and the phone can be properly tuned to the best band service provider or be interfaced for minimum power drain at step 1214. The Clearinghouse will also allow reporters of information to be ranked based on their accuracy and collaboration with other reporters of quality/RF/services/information. Furthermore, the service providers or spectrum allocations, themselves, would be ranked by the Clearinghouse (e.g. at this Location, WiMax band is best, and gets 5 starts, whereas PCS Band has bad coverage or performance, and only gets 1 star, etc). This listing information can be maintained in the phone at step 1216 and can be updated based on current and estimated future locations. Step 1218 shows that when the device is in motion, updates can be obtained automatically from the Clearinghouse. Individuals who report in their observations may also be ranked (.e.g. Bill Smith does a good job reporting quality of different radio bands and services near Austin, and gets 5 starts, or a 99% rating, as opposed to someone who frauds the system by reporting bogus measurements—the peer group or the web crawlers/data analysis of the database would find these outliers and give them lower rankings, say 1 star or 10% accuracy). These rankings could be weighted to give assessment of the entire radio spectrum and services/quality/coverage in any location on the earth. This will be a critical and vital invention for the future of multiband radios, and has clear applications in open-access wireless which is likely to evolve with the 700 MHz FCC spectrum auction, and the entrance of Google, Amazon, EBay/Skype into the wireless world. This invention also has strong impact and will assist the evolution of Cognitive or Software defined radios (SDRs).

Using the Clearinghouse for Local Advertising using wireless infrastructure

This invention may be extended further to allow for distributed wireless content, either provided through standard internet browsers, or through recorded, or real-time means in audio or video or multimedia or text formats, that may be transmitted through transmission to cellphone devices, computer devices, or other mobile devices or other devices that are connected using wireless transmission, known now or in the future, to be delivered on a location-specific basis. As mentioned above, media content may be audio, video, multimedia, or webpage based, as well as other forms that may be known now or in the future. This invention has particular applicability to local advertising, as advertising content is often difficult to provide through the worldwide web. Furthermore, this invention can be used generally for any type of content, not just advertisement content, that has specific value to users or viewers in specific geographic, physical locations. That is, the invention may be used for signage that provides location-specific content to wireless displays or wireless users, for example, or which, for example, provides information about movies that are playing in a movie theater to wireless users who are in the parking lot of the movie theater.

Today, the internet advertising industry has difficulty in providing location-based content, since people who log onto the web may be located anywhere in the world. For example, on a Google search page, ads that appear on the right hand column of the display, are generally not displayed in a location-specific basis. Indeed, access over the internet allows users from all over the planet to access a particular webpage, through a web address (an Internet Protocol address). Thus, the standard internet protocol does not allow a web server to know, ahead of time, the specific physical location of a particular browsing user. While there are techniques to improve the guess as to where web browsers are located, through the use of cookies and previously entered data by a fixed internet user, wireless communications (which includes optical communications, and all electromagnetic signals), based on the law of physics such as Friis free space equation, is the best way to provide local coverage, since wireless is limited in propagation distance based on a number of factors such as the radiated power of the transmitter, the height of the transmitting and receiving antenna, antenna gains, and carrier frequency, obstructions in the physical environment, etc. Thus, wireless provides a built in ability to ensure location-based advertising which has not been previously exploited. This invention describes a way that advertising content can be pushed to users within the radio frequency (RF) propagation range of mobile/portable/fixed users who are tuned to a specific transmitted signal. Similarly, the processes described herein have application for devices that are capable of receiving multiple transmitted signals, from multiple radiating sources, either simultaneously or in sequence, or sporadically.

The concept of today's internet-based advertising is to use generic, nationwide webpages, such as a typical webpage that may use banner ads to offer a product or service, or the use of banner ads on web blogs or other web pages, or adsense or adword ads (by Google, for example). However, the difficulty with these ads, from the standpoint of the advertiser, is that it is unknown where the specific user is physically located, thus it is very difficult to offer, in an efficient or market-driven manner, ads that are specifically local to the wireless users that might have interest (for example, a local coffee shop in a particular city would not want to pay for a national ad on a national webpage, but would rather pay only for those ads which are viewed specifically by mobile or fixed wireless users who are in the same city/town or neighborhood of the café and who want to take advantage of special coffee specials.

One approach to provide location-based ads, is being pursued by Loopt, where they are working to sign up carriers in the cellular radio field. It was reported in December 2007 that Loopts has partnerships with Sprint Nextel and Boost Wireless. Loopt relies on users being able to run a middlewear application on their cellphone device, which allows the mobile device to send its GPS coordinates through the cellular infrastructure, and based on the cellular infrastructure and GPS location, the location of user is determined, and an ad may be pushed to the device from the carrier network. See New York Times, Feb. 6, 2008, Business Day article, "In CBS Test, Mobile ads find users"

In the invention, I approach location-based advertising in a different, and more efficient way than Loopt. The invention allows for the Clearinghouse and its database to be an integral and valuable part of a novel local advertising system and method, that uses readily available hardware to store, reformat, revise and transmit altered web pages that have specific local content. No middlewear is required on the mobile/fixed wireless device in this invention, although in some embodiments it may be used for acquiring user data, and helping to cache or provision the invention in a more efficient manner.

By using the Clearinghouse and database for radio quality and service for wireless devices, and by maintaining an on-going list of performance records of users and infrastructure locations, it becomes possible to build a listing of towers, frequencies, types of service, users who have permission/access abilities to the network, coverage regions of a particular tower or transmitting signal, etc. as well as the physical location and proximity of users on one or more wireless services. However, even without the GPS information from users, one can provide location based advertising, as disclosed herein and in conjunction with the knowledge of towers, frequencies, and services offered.

Instead of having to determine the GPS location of each mobile user, as with Loopt, using the present invention it is possible to use the information of the specific tower or transmitter site in order to "alter" or "fill" the national webpage with specific, local ads in particular places on the displayed webpage. That is, a server, which may be remote or located at the same location as the wireless infrastructure providing the local signal, would be used to alter, modify, or rewrite the "original" webpage, and then would transmit the "localized" webpage over the local infrastructure, so that local advertisements would be used in place of national advertisements, in various places on a webpage, or in various audio or video fill locations, or in specific text messages that are tailored for specific locations.

In this manner, its possible for a national or international organization, or an international web portal, to be able to provide local, target-specific ads, through knowledge of the location of specific base stations. In addition, the clearinghouse system would further allow particular users to be monitored for what type of ads they use, how they select different links (in the case of a webpage) and the internet browsing patterns or effectiveness of the localized ads.

Figure 13:
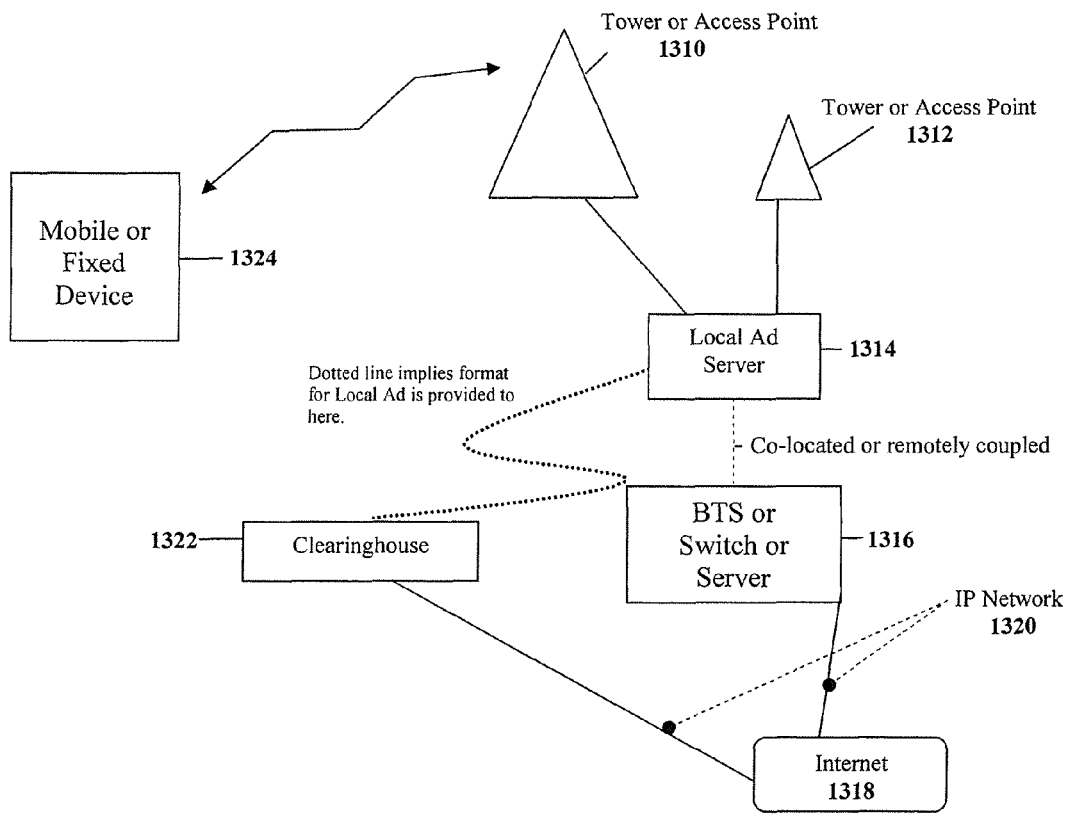
FIG. 13 shows a diagram of wireless infrastructure using an Internet Protocol (IP) network backhaul from the base transceiver station (BTS) or switch. The BTS or switch, as well as infrastructure components closer to edge of the wireless network, are coupled to the clearinghouse using IP or world wide web addressing, where through such addressing, advertising content is provided to particular pieces of infrastructure through an advertiser server that may be located centrally or may be integrated and coupled to various wireless infrastructure components.

FIG. 13 shows a diagram of local content wireless infrastructure. FIG. 13 shows a computerized Clearinghouse system, that may be a web-server, or multiple servers, that may be located at, near, or remote from the base station infrastructure 1310 or 1312, whereby this server 1314 (or group of servers) may be provided the local-advertising information, in a machine readable format that allows the server 1314 to "override" or replace the national webpage server in particular parts of the displayed webpage at the mobile/fixed wireless device. Note that the fixed infrastructure at the edge of the wireless network, shown as a base transceiver station (BTS) or Switch or WLAN access point 1316, is connected to the Internet 1318 through an IP network 1320 backbone. The Clearinghouse 1322 is also connected to the IP Network 1320, thus it is possible to couple the Clearinghouse 1322 content to the edge infrastructure 1316, as contemplated above (see FIGS. 1, 5, 6, 7, 8 and 9, for example). The Clearinghouse 1322 provides format information for the content server (also called an ad server), so that the content server 1314 knows what content to offer, and how to integrate the local content it has to offer along with the standard content provided over the wireless network. Noted that Clearinghouse 1322 can be copied to the local ad server 1314. The local advertising content or content from the Clearinghouse 1322 is transmitted to the mobile or fixed device 1324, thereby assuring delivery of localized advertising to the mobile or fixed device 1324.

The local content server 1314 is shown coupled to the edge infrastructure 1316 in FIG. 13. This local content server 1314 may receive copies of local content as provided by the Clearinghouse 1322, or may obtain content from other sources over the worldwide web, under the control of the Clearinghouse 1322. Note, however, the local content server 1314 may be located remotely from the edge, or it may alternatively be embedded within the hardware of the edge infrastructure 1316. Since there is internet connectivity, the physical location of the content server 1314 doesn't matter tremendously, unless very high speed traffic is contemplated, in which case providing the server near the edge infrastructure 1316 is the best choice.

Using the position-tagged listing of wireless assets for one or multiple bands, and one or multiple carriers, the disclosed invention provides the ability to provide local advertising content for transmission in the datastreams at particular local infrastructure locations. This may be done by providing content for a localized ad (or other content) in a computer file, and then providing a format for said content within the file so that it may be conveniently packaged/placed, as either a banner or pop-up or adword type or other form suitable for use on a partial webpage display that is transmitted by the edge infrastructure 1316. The mobile or fixed device 1324 receives the local advertising content from the infrastructure 1310 and 1312, and establishments desiring localized advertisements to devices within range of the infrastructure can be assured of a more targeted advertising campaign.

Figure 14:
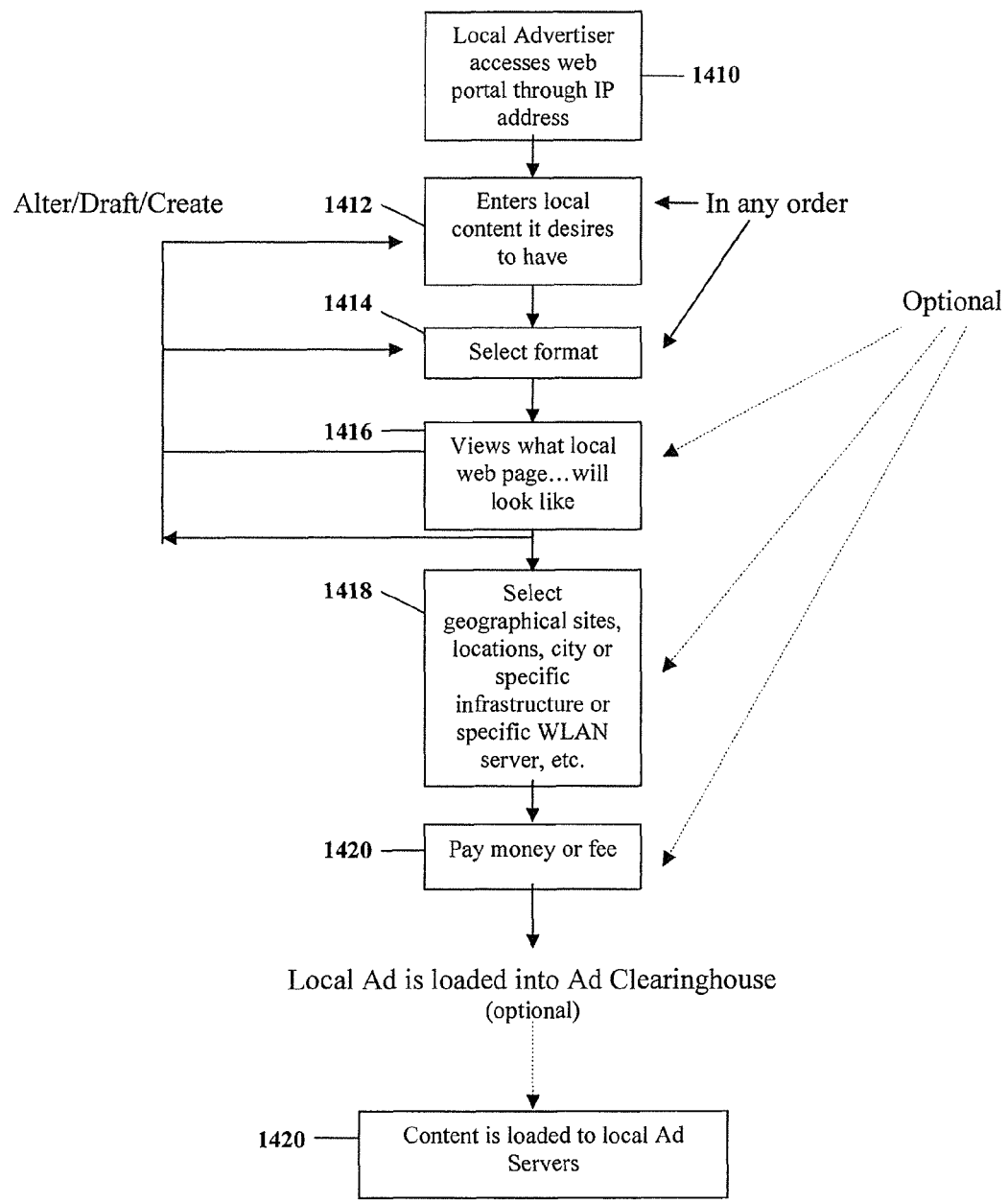
FIG. 14 illustrates a flow diagram of how local advertising may be cached or stored at the clearinghouse and may also be optionally distributed to local ad servers throughout a wireless network.

FIG. 14 shows a flow chart that allows local advertisers or local content providers to access the Clearinghouse system through the worldwide web, where the local advertisers can create and alter localized content. When the content is created at step 1410 and loaded onto the Clearinghouse system at step 1412, the advertiser is then able to use the Clearinghouse to specify the format of their local content at step 1414, and view it at step 1416 as it will appear in the local edge transmissions, and may select geographical areas, cities, or specific locations at step 1418 where the local content may appear. The Clearinghouse may use its billing application to receive revenues at step 1420 for local advertisers, and the local content is then loaded into the Clearinghouse, and may be distributed to the network edge servers at step 1422. As noted in FIG. 14, the order of steps can vary, and the process allows the advertiser to alter, draft, and create in an iterative fashion to achieve the content or style that is desired and to better identify the targeted audience. In some embodiments, the advertising may be distributed to a plurality of local ad servers 1420 (e.g., distribution to multiple states during a primary campaign season for a national elected office, etc.) Also, as noted in FIG. 14, some of the steps are optional and can be varied in the practice of the invention. For example, instead of a monetary payment, the advertiser may provide some other form of service in exchange for the local advertising afforded by the invention.

Figure 15:
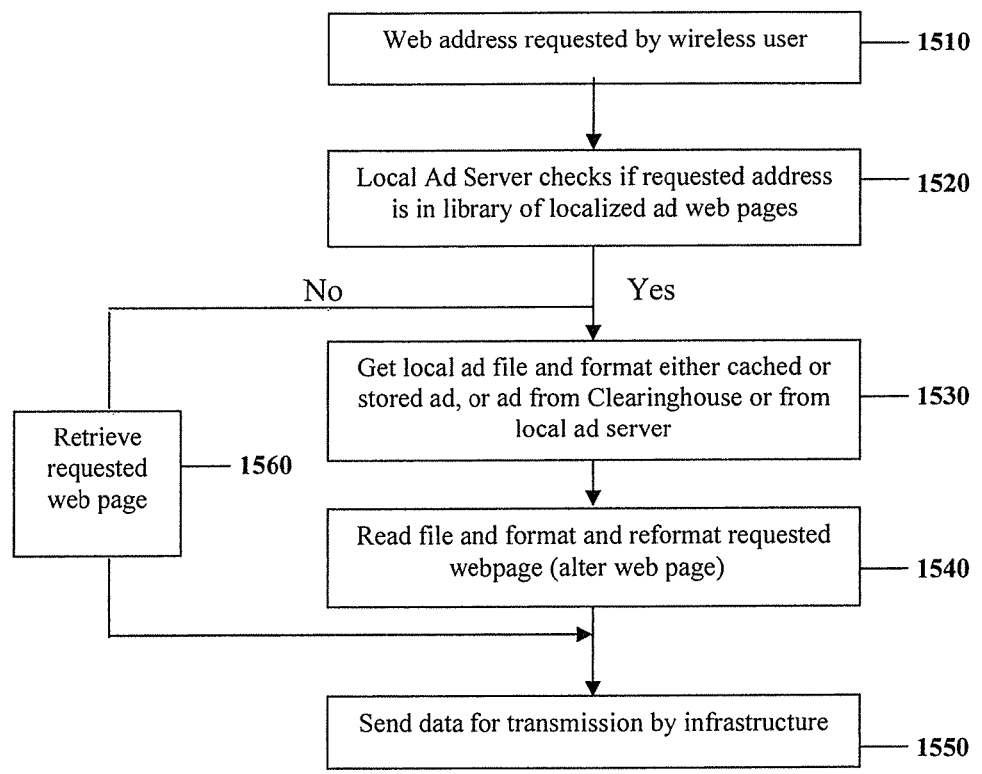
FIG. 15 shows a flow diagram of how the clearinghouse may be used to provide local advertising content by identifying the requested IP address or worldwide web address requested by the wireless device (wireless user) and by formatting data suitable for interpretation by the wireless user.

FIG. 15 shows how the local ad server continually checks the web pages that are accessed by the local users in the vicinity of the edge infrastructure. Once a local advertiser has registered with the Clearinghouse, and has placed its content on the Clearinghouse (and also the local ad servers, if caching is done), then the local content provider's web address is added to a list of local advertisers. When any webpage is requested by a local wireless user at step 1510, the local ad server (or, alternatively, the Clearinghouse or the edge infrastructure itself) searches the list of local advertisers at step 1520, and if a local advertiser's web address is received at step 1530, the local ad server replaces the "normal" national webpage with the content specified in the local format at step 1540. This modified, local format web page is then passed to the edge infrastructure at step 1550 for transmission over the local edge network. It should be clear that while web pages are discussed here, any type of content could be replaced, and any type of local content could be inserted in this manner. If the local advertiser's web address is not received the requested web page is retrieved at step 1560.

The local webpage may be of ordinary form, with the local content in standard form as would be used for display on a wireless device (such as a laptop or cellphone). Then, a server computer or computers is used to take a source webpage (say from the national or the standard template provided over the internet) to then alter the datastreams transmitted from the local infrastructure, being different from the datastream obtained from the source (such as a national webpage), and altered specifically for the specific physical location of the transmitter tower, or group of towers, or infrastructure that is located in some physical location such that wireless coverage is provided within a specified geographical range. The transmitted local webpage is altered efficiently based on the format of the local content file, which provides instructions as to where, specifically on the web page, the local ad should be placed. This placement may either replace an ad on the national webpage, or it could be a complete replacement of the national webpage with a custom local webpage, or some other content could be made to be transmitted from the local infrastructure.

This allows an advertiser to have local information filled in the proper locations on a web page display, or at the proper time sequence or file location in an audio or video or multimedia transmission. This also allows web portals such as Google or Yahoo or Ebay or any other to provide localized advertising without requiring a specific GPS coordinate for each user in its region, thereby preserving valuable wireless resources that would otherwise be used up to provide position acquisition and handshaking between the wireless infrastructure and the mobile device.

The invention also has the ability to measure web statistics, web page viewing, information about the use, page views, and click-through activity of localized advertisement or content webpages that are provided by the Clearinghouse or the local ad-server. It is understood that web hits may be counted and tabulated, using many commercial providers of such web statistics, or may be implemented by software running at the local content server, or at the Clearinghouse, in order to count the various views and uses of webpages by local end users. This data would be valuable for justifying and presenting the value and utility of local ad or local content provisions to the owner of the wireless network, as well as determining formats, presentation techniques, delay times, and other technical and non-technical implementation of local content for improved activity, use, and monetization.

The Clearinghouse could maintain a large archive of local advertisement files, and formats, that could be used and invoked over multiple bands and for one or many carriers and services that could be provided over wireless infrastructure for specific locations on earth. This invention can be extended to work for different kinds of wireless infrastructures and devices, for example WiFi LANs are different than cellular/WiMax/LTE systems, which are different than standard 2.5 cellular. The advertising system could be used in conjunction with the clearinghouse system described above, and one can envision this type of local advertising system being available for each type of service or carrier, or for a specific set of infrastructure (e.g. a WLAN system in a convention center, where our invention would provide specific local advertising for the specific convention center, whereas other convention centers around the world would have their own specific ads placed on their web pages). This invention could also be used to provide local ad content and information for all types of infrastructures and wireless standards from a single clearinghouse.

It is envisioned that the local ad content can be updated by a specific advertiser, where they are able to access a web portal and format their ad, along with payment for their ad, and having the ability indicate which city, specific tower locations, or specific geographies they would like to have their ad appear on. Furthermore, they may pick if they want continual, or partial time ad placements, which would be at differing costs.

The advertiser would have the ability to view through the web portal what their ad would look like to mobile users in the specific selected geographic area, and they could compare that to the template, or national website.

FIGS. 13 through 15 illustrate an exemplary embodiment of how the local ad sever and Clearinghouse work together. They may be the same device, or information from the Clearinghouse may be copied, in part or in whole, to the local ad server. The local ad server, itself, may be collocated with base station or network provider infrastructure, or itself may be remote and addressable, although speed is of the essence to allow the localized webpage to quickly be revised and sent out over the infrastructure. It should be clear, however, that this disclosure is not limited to advertising, but any type of content may be applicable (e.g., localized emergency alerts; localized traffic announcements, etc.).

While the invention has been described in terms of several embodiments, it will be recognized that the invention can be practiced in a variety of foams within the scope of the appended claims.

The invention claimed is:

1. A clearinghouse system for communications networks, comprising:
one or more computers which interface with a database, said database including
records pertaining to one or more telecommunications carriers which identify infrastructure for one or more telecommunications carriers in terms of one or more of (i) types of equipment and performance characteristics for said types of equipment, (ii) location information including one or more of geographical areas, and (iii) business terms for telecommunications services or for provision of said infrastructure, and
records pertaining to one or more end users which identify one or more of (i) telecommunications assets or devices or equipment owned or controlled by one or more of said end users, (ii) property assets owned or controlled by one or more of said end users, (iii) locations or types of devices or equipment used by one or more of said end users, (iv) performance, quality of service, or perceived quality or value experienced or desired by one or more of said end users at one or more locations, and (v) desired business terms or preferences for use of said telecommunications assets, said devices, said equipment or said property assets by one or more of said end users;
one or more electronic interfaces to said one or more computers which permit said one or more telecommunications carriers or one or more of said end users or one or more third parties to selectively use, view, collect, or catalog information about one or more of (a) available telecommunications assets or properties and locations thereof, (b) locations or types of equipment or devices or property assets used by one or more of said end users, (c) the owners or tenants of said available telecommunications assets or properties, (d) infrastructure needs of one or more telecommunications carriers, (e) proposed business terms for fulfilling said infrastructure needs with said telecommunications assets or said property assets, and (f) performance or quality of service or perceived quality or value experienced or desired by one or more of said end users,
wherein notification or access to information associated with said records in said clearinghouse system is provided to one or more of:
one or more of said end users,
one or more of said one or more telecommunications carriers;
one or more of said one or more third parties who are not end users or a telecommunications carrier,
wherein said notification is provided when one or more of the following events occur:
(1) one or more of said end users, or one or more of said one or more telecommunications carriers, or one or more of said third parties who are not end users or a telecommunications carrier request information associated with said records in said clearinghouse system pertaining to either one or more telecommunications carriers or one or more of said end users,
(2) suitable available telecommunications assets or properties for said infrastructure needs of said one or more telecommunications carriers at one or more locations are identified
(3) performance, quality of service, or perceived quality or value of delivered telecommunications service for one or more of said end users, or said one or more telecommunications carriers, becomes worse or better than a specified tolerance or desired performance level as specified by one or more of said end users,
(4) performance, quality of service, or perceived quality or value of delivered telecommunications service for one or more of said end users, or said one or more of said one or more telecommunications carriers, becomes worse or better than a specified tolerance or desired performance level as specified by one or more of said telecommunications carriers, and (5) performance, quality of service, or perceived quality or value of delivered telecommunications service for one or more of said end users, or said one or more telecommunications carriers, becomes worse or better than a specified tolerance or desired performance level as specified by one or more of said third parties.

2. The clearinghouse system of claim 1 wherein said database includes public records which include, for a plurality of geographic locations, one or more of: maps, location coordinates, or mapping information for said geographic locations, zoning information for said geographic locations, local ordinances for said geographic locations, contact information for government officials for said geographic locations, and information about one or more carriers serving said geographic locations.

3. The clearinghouse system of claim 2 further comprising a computation application, which interfaces with at least one of said one or more computers, and which identifies optimum or prioritized locations for said infrastructure needs based on both said records of some of said one or more end users and said public records.

4. The clearinghouse system of claim 1 wherein said one or more electronic interfaces permits one or more public users, who are not telecommunications carriers or end users, to selectively view or catalog information about said available telecommunications assets or properties and locations thereof, and said infrastructure needs of one or more telecommunications carriers for one or more locations.

5. The clearinghouse system of claim 1 wherein said one or more electronic interfaces includes one or more of an Internet interface, a telephone, a speech, handwriting or fingerprint recognition device, electronic mail interface, a facsimile, voicemail, a webserver, a computer, a mouse, a keyboard, VoIP, a wireless or portable computing or communications device, or a digital recorder.

6. The clearinghouse system of claim 1 wherein at least one of said one or more electronic interfaces is in communication with the world wide web, and wherein said records for one or more telecommunications carriers and said records for one or more end users can be viewed using a browser and can be retrieved by a web crawler.

7. The clearinghouse system of claim 1 further comprising a security application and billing application which permits charging one or more of said one or more telecommunications carriers, said one or more end users, or said one or more third parties for use of said clearinghouse system.

8. The clearinghouse system of claim 1 further comprising a communications application which permits secure negotiation and acceptance of business and legal terms between one or more telecommunications carriers and one or more end users for use of said one or more telecommunications assets or one or more property assets.

9. The clearinghouse system of claim 8 wherein said property assets are selected from a building, a roof top, a billboard, a light pole, a tower, and a lot or acreage.

10. The clearinghouse system of claim 1 wherein said performance or quality of service information includes information from one or more of multiple bands, multiple carriers, and multiple end users.

11. The clearinghouse system of claim 1 further comprising one or more local ad servers in communication with said one or more electronic interfaces, said local ad servers providing localized content to one or more mobile or fixed devices in a specific location.

12. The clearinghouse system of claim 11 wherein said local ad servers provide web page view data and usage statistics to said database through said one or more electronic interfaces.

13. The clearinghouse system of claim 1 further comprising a computation application, which interfaces with at least one of said one or more computers, and which identifies optimum or prioritized locations for said infrastructure needs based on said records of said one or more of end users.

14. The clearinghouse system of claim 1 further comprising an application program for forming binding agreements between at least one of said one or more telecommunications carriers and at least one of said one or more end users.

15. The clearinghouse system of claim 1 wherein said one or more computers which interface with said database and said one or more electronic interfaces are configured to accommodate queries or updates from one or more of an Internet interface, a telephone, a speech, handwriting or fingerprint recognition device, an electronic mail interface, a facsimile, voicemail, a webserver, a mouse, a keyboard, a computer, VoIP, a wireless or portable computing or communications device, or a digital recorder.

16. The clearinghouse system of claim 1 further comprising one or more application programs for submitting location, performance, quality of service, or perceived quality or value information, experienced or desired, between at least one of said one or more telecommunications carriers and at least one of said one or more end users.

17. The clearinghouse system of claim 16 wherein said one or more application programs permits submitting to be performed manually by one or more end users or by one or more carriers or by a third party.

18. The clearinghouse system of claim 16 wherein said one or more application programs permit submitting to be performed automatically by one or more programs or applications by communications between one or more end users and said clearinghouse system, or between one or more fixed or mobile devices and said clearinghouse system.

19. A method for providing a clearinghouse system for communications networks, comprising the steps of:

providing one or more computers which interface with a database, said database including records pertaining to one or more telecommunications carriers which identify infrastructure for one or more telecommunications carriers in terms of one or more of (i) types of equipment and performance characteristics for said types of equipment, (ii) location information including one or more of geographical areas, and (iii) business terms for telecommunications services or for provision of said infrastructure, and records pertaining to one or more end users which identify one or more of (i) telecommunications assets or devices or equipment owned or controlled by one or more of said end users, (ii) property assets owned or controlled by one or more of said end users, (iii) locations or types of devices or equipment used by one or more of said end users, (iv) performance, quality of service, or perceived value experienced or desired by one or more of said end users at one or more locations, and (v) desired business terms or preferences for use of said telecommunications assets, said devices, said equipment or said property assets by one or more of said end users;

permitting, using one or more electronic interfaces to said one or more computers, said one or more or properties telecommunications carriers or one or more of said end users or one or more third parties to selectively use, view, collect, or catalog information about one or more of (a) available telecommunications assets or property and locations thereof, (b) locations or types of equipment or devices or property assets used by one or more of said end users (c) the owners or tenants of said available telecommunications assets or properties, (d) infrastructure needs of one or more telecommunications carriers, (e) proposed business terms for fulfilling said infrastructure needs with said telecommunications assets or said property assets, and (f) performance or quality of service experienced by one or more of said end users; and either or both providing access to information associated with said records in said clearinghouse system or providing a notification to one or more of:

one or more of said end users, one or more of said one or more telecommunications carriers;

one or more of said third parties who are not end users or a telecommunications carrier, wherein notification is performed when one or more of the following events occur:

(1) one or more of said end users, or one or more of said one or more telecommunications carriers, or one or more of said third parties who are not end users or a telecommunications carrier request information associated with records in said clearinghouse system pertaining to either one or more telecommunications carriers or one or more of said end users, (2) suitable available telecommunications assets or properties for said infrastructure needs of said one or more telecommunications carriers at one or more locations are identified (3) performance, quality of service, or perceived value of delivered telecommunications service for one or more of said end users, or said one or more telecommunications carriers, becomes worse or better than a specified tolerance or desired performance level as specified by one or more of said end users, (4) performance, quality of service, or perceived value of delivered telecommunications service for one or more of said end users, or said one or more of said one or more telecommunications carriers, becomes worse or better than a specified tolerance or desired performance level as specified by one or more of said telecommunications carriers, and (5) performance, quality of service, or perceived value of delivered telecommunications service for one or more of said end users, or said one or more telecommunications carriers, becomes worse or better than a specified tolerance or desired performance level as specified by one or more of said third parties.

20. The method of claims 19 wherein said database includes public records which include, for a plurality of geographic locations, one or more of maps, location coordinates, or mapping information for said geographic locations, zoning information for said geographic locations, local ordinances for said geographic locations, contact information for government officials for said geographic locations, and information about one or more carriers serving said geographic locations.

21. The method of claim 19, further comprising the step of permitting, using said one or more electronic interfaces, one or more public users, who are not telecommunications carriers or end users, to selectively view or catalog information about said available telecommunications assets or properties and locations thereof, and said infrastructure needs of one or more telecommunications carriers for one or more locations.

22. The method of claim 19 wherein said one or more electronic interfaces includes one or more of an Internet interface, a telephone, a speech, handwriting or fingerprint recognition device, electronic mail interface, a facsimile, voicemail, a webserver, a computer, a mouse, a keyboard, VoIP, a wireless or portable computing or communications device, or a digital recorder.

23. The method of claim 19 further comprising the step of allowing for communications between at least one of said one or more electronic interfaces and the world wide web, and wherein said records for one or more telecommunications carriers and said records for one or more end users can be viewed using a browser and can be retrieved or obtained.

24. The method of claim 19 further comprising the step of using a security application and a billing application operating on one of said one or more computers to charge or allow for payment to made to one or more of said one or more telecommunications carriers, or said one or more end users, or said one or more third parties, for use of said clearinghouse system.

25. The method of claim 19 further comprising the step of using a communications application operating on at least one of said one or more computers to permit secure negotiation and acceptance of business and legal terms between at least two parties including one or more telecommunications carriers, one or more third parties, and one or more end users, for use of said one or more telecommunications assets or one or more property assets.

26. The method of claim 25 wherein said property assets are selected from a building, a rooftop, a billboard, a tower, a light pole, and a lot or acreage.

27. The method of claim 19 wherein said database includes performance or quality of service information or perceived quality or value information for specific locations or specific end users.

28. The method of claim 19 further comprising the step of updating, either automatically or manually, by one or more end users, one or more fixed or mobile devices, one or more telecommunications carriers, or one or more third parties using said one of said one or more electronic interfaces, said performance or quality of service information or perceived quality or value information.

29. The method of claim 28 wherein said step of updating is performed by said one or more electronic interfaces providing performance or quality of service information or perceived quality or value information to or from one or more mobile or fixed devices that are located in or will be located in said specific locations.

30. The method of claim 29 where updating is performed manually.

31. The method of claim 29 where updating is performed automatically using one or more programs or applications or devices.

32. The method of claim 28 wherein said step of updating is performed by said one or more end users, said one or more fixed or mobile devices, said one or more telecommunications carriers, or said one or more third parties that are not end users or telecommunications carriers providing performance or quality of service information or perceived quality or value information to the clearinghouse system.

33. The method of claim 32 where updating is performed manually.

34. The method of claim 32 where updating is performed automatically using one or more programs or applications or devices.

35. The method of claim 28 wherein said performance or quality of service information or perceived quality or value information includes information from one or more of multiple bands, multiple carriers, multiple mobile or fixed devices, or multiple end users from multiple bands or carriers.

36. The method of claim 19 further comprising the step of providing localized content to one or more mobile or fixed devices in a specific location using one or more local ad servers in communication with said one or more electronic interfaces.

37. The method of claim 19 further comprising the step of identifying optimum or prioritized locations for said infrastructure needs based on said records of said one or more end users using a computation application which interfaces with at least one of said one or more computers.

38. The method of claim 19 further comprising the step of identifying optimum or prioritized locations for said infrastructure needs based on both said records of said one or more end users and said public records using a computation application which interfaces with at least one of said one or more computers.

39. The method of claim 19 further comprising the step of submitting location, performance, quality of service, or perceived quality or value information, experienced or desired, from at least one of said one or more telecommunications carriers, one or more fixed or mobile devices, and at least one of said one or more end users, using an application program which operates on at least one of said one or more computers or which is accessible to at least one of said one or more computers through an electronic interface.

40. The method of claim 39 wherein said step of submitting is performed manually by one or more end users or by one or more carriers or by a third party.

41. The method of claim 39 wherein said step of submitting is performed automatically by one or more programs or applications associated with a device of said one or more end users or by one or more carriers or by a third party.

42. The method of claim 19 further comprising the step of querying or updating the clearinghouse system by one or more of an Internet interface, a telephone, a speech, handwriting or fingerprint recognition device, electronic mail interface, a facsimile, voicemail, a webserver, VoIP, a wireless or portable computing or communications device, or a digital recorder.

43. The method of claim 19 further comprising the step of forming binding agreements between at least one of said one or more telecommunications carriers and at least one of said one or more end users using an application program which operates on at least one of said one or more computers, or which is accessible to at least one of said one or more computers through an electronic interface.

44. The method of claim 36 wherein said local ad servers provide web page view and usage statistics to said database through said one or more electronic interfaces.

* * * * *